(12) United States Patent
Kim et al.

(10) Patent No.: US 10,692,662 B2
(45) Date of Patent: Jun. 23, 2020

(54) ELECTRIC DOUBLE LAYER DEVICE

(71) Applicant: NESSCAP CO., LTD, Gyeonggi-do (KR)

(72) Inventors: Young Jin Kim, Gyeonggi-do (KR); Gwan Goo Jung, Gyeonggi-do (KR)

(73) Assignee: Nesscap Co., Ltd., Gyeonggi-do (KR)

(*) Notice: Subject to any disclaimer, the term of this patent is extended or adjusted under 35 U.S.C. 154(b) by 318 days.

(21) Appl. No.: 14/990,382

(22) Filed: Jan. 7, 2016

(65) Prior Publication Data

US 2017/0200567 A1    Jul. 13, 2017

(51) Int. Cl.

| | |
|---|---|
| *H01G 11/70* | (2013.01) |
| *H01G 11/74* | (2013.01) |
| *H01G 11/78* | (2013.01) |
| *H01G 11/80* | (2013.01) |
| *H01M 2/26* | (2006.01) |
| *H01M 2/36* | (2006.01) |
| *H01M 4/66* | (2006.01) |
| *H01M 10/04* | (2006.01) |
| *H01G 11/82* | (2013.01) |

(52) U.S. Cl.
CPC ............ *H01G 11/70* (2013.01); *H01G 11/74* (2013.01); *H01G 11/80* (2013.01); *H01G 11/82* (2013.01); *H01M 2/263* (2013.01); *H01M 2/365* (2013.01); *H01M 4/667* (2013.01); *H01M 10/0431* (2013.01); *H01G 11/78* (2013.01); *Y02E 60/13* (2013.01); *Y02T 10/7022* (2013.01)

(58) Field of Classification Search
CPC ........ H01G 11/70; H01G 11/74; H01G 11/78; H01G 11/80; H01G 11/82; H01M 2/365; H01M 4/64; H01M 4/667; H01M 10/0431; H01M 2/263; H01M 2/26; H01M 4/66; H01M 10/04; Y02T 10/7022; Y02E 60/13

See application file for complete search history.

(56) References Cited

U.S. PATENT DOCUMENTS

| | | | | |
|---|---|---|---|---|
| 6,631,072 | B1* | 10/2003 | Paul | H01G 9/008 361/502 |
| 2002/0076604 | A1* | 6/2002 | Matsuoka | H01G 9/12 429/53 |
| 2006/0245144 | A1* | 11/2006 | Hozumi | H01G 9/016 361/511 |

(Continued)

FOREIGN PATENT DOCUMENTS

| | | | | |
|---|---|---|---|---|
| CN | 201222422 | * | 4/2009 | H01G 2/14 |
| CN | 102738498 | A | 10/2012 | |

(Continued)

OTHER PUBLICATIONS

H11-251190 Sep. 1999 ESPACENET Abstract.*

(Continued)

*Primary Examiner* — Jonathan G Leong
*Assistant Examiner* — Aaron J Greso
(74) *Attorney, Agent, or Firm* — Knobbe Martens Olson & Bear LLP

(57) ABSTRACT

An electric double layer device is configured such that a lower terminal is directly withdrawn from a lower collecting plate in the same manner as the manner in which an upper terminal is directly withdrawn from an upper collecting plate, thereby improving productivity and ease of assembly, and in addition increasing connection force.

18 Claims, 22 Drawing Sheets

(56) References Cited

U.S. PATENT DOCUMENTS

| | | | |
|---|---|---|---|
| 2007/0105014 A1* | 5/2007 | Shin | H01M 2/0275 429/152 |
| 2010/0216013 A1* | 8/2010 | Kim | H01M 2/00 429/164 |
| 2012/0112393 A1* | 5/2012 | Januma | F16F 3/023 267/103 |
| 2013/0250475 A1* | 9/2013 | Mori | H01G 9/008 361/301.5 |

FOREIGN PATENT DOCUMENTS

| | | | | |
|---|---|---|---|---|
| CN | 202650836 | * | 1/2013 | ............ H01G 4/002 |
| CN | 102959662 A | | 3/2013 | |
| CN | 104103802 A | | 10/2014 | |
| CN | 105140459 A | | 12/2015 | |
| DE | 2350272 | * | 4/1975 | ............ H01G 4/224 |
| EP | 1 688 975 A1 | | 8/2006 | |
| JP | H11-251190 | * | 9/1999 | ............ Y02E 60/13 |
| KR | 10-2000-0075011 A1 | | 12/2000 | |
| KR | 10-2012-0027665 A | | 3/2012 | |
| KR | 2014-0143641 A | | 12/2014 | |

OTHER PUBLICATIONS

H11-251190 Sep. 1999 English Machine Translation.*
Notification of Reason for Refusal dated Jun. 2, 2015 in related Korean Application No. 10-2014-0102566, filed Aug. 8, 2014, in 2 pages.
Notification of Reason for Refusal dated Dec. 4, 2015 in related Korean Application No. 10-2014-0102566, filed Aug. 8, 2014, in 2 pages.
Decision to Grant dated Jun. 27, 2016 in related Korean Application No. 10-2014-0102566, filed Aug. 8, 2014, in 1 page.
Extended European Search Report dated Jul. 1, 2016 in related European Application No. 16152106.7, filed Jan. 20, 2016, in 7 pages.
First Office Action dated Jun. 1, 2018 in related Chinese Application No. 201610048460.0.

* cited by examiner (CURLING)

ELECTRIC DOUBLE LAYER DEVICE

BACKGROUND AND SUMMARY

The present invention relates to an electric double layer device, and, more particularly to an electric double layer device configured such that a lower terminal is directly withdrawn from a lower collecting plate in the same manner as the manner in which an upper terminal is directly withdrawn from an upper collecting plate, thereby improving productivity and ease of assembly, increasing connection force, and improving discharge efficiency during the discharge of high current while reducing internal equivalent resistance.

In general, an electric double layer device is a device such as a battery, a capacitor, or an electrolytic condenser, which stores electrical energy. The electric double layer device electrically charged and discharged using electrodes that are electrically conductive. Electric double layer devices are used in cellular phones, GPS receivers, MP3 players, and backup memories. In addition, electric double layer devices are used in wind energy systems, solar energy systems, and motors of electric vehicles and hybrid electric vehicles.

An electric double layer is a layer configured such that positive charges are successively positioned on one surface of a thin film layer of an object and negative charges are successively positioned on the other surface of the thin film layer or such that both surfaces of the thin film layer have the same surface density. The electric double layer is typically a double layer that includes electric dipoles. In general, charges are rearranged at the interface between different materials, whereby an electric double layer is formed.

Positive ions or negative ions in a liquid-state aqueous electrolytic solution are selectively adsorbed at the interface between a solid-state electrode and a liquid-state aqueous electrolytic solution, solid surface molecules are dissociated, or the positive ions or the negative ions are adsorbed on the dipole interface, whereby an electric double layer is formed. This layer is referred to as a Helmholtz layer.

Such an electric double layer is closely related to various electrochemical surface phenomena, such as an electrode reaction, an electrokinetic phenomenon (an electrophoretic phenomenon), and the stability of colloids.

One example of such an electric double layer device may be a capacitor.

In the electric double layer capacitor, an electrostatic layer is formed at the interface between an activated carbon electrode and an organic electrolyte, and an electric double layer state is used as the function of a dielectric to accumulate electricity in the same manner as in a battery.

In particular, charges that accumulate in an electric double layer, formed between a solid electrode and a solid-state or liquid-state electrolyte, are used.

The capacitor has lower energy density than the battery. However, the capacitor is superior to the battery in terms of power density, that is, instantaneous high output. In addition, the capacitor is usable hundreds of thousands of times. That is, the lifespan of the capacitor is semi-permanent. For these reasons, capacitors are used in various fields.

The electric double layer capacitor is operated according to the following principle. When direct current voltage is applied to a pair of solid electrodes in a state in which the solid electrodes are placed in an electrolyte ion solution, negative ions are electrostatically drawn to an electrode polarized as a positive electrode, and positive ions are electrostatically drawn to an electrode polarized as a negative electrode. As a result, an electric double layer is formed at the interface between each electrode and the electrolyte. In particular, activated carbon has a plurality of pores. For this reason, the electric double layer is easily formed. The capacitance of the stored charge may be calculated using Equation 1 below.

$$C = \frac{\varepsilon_0 \varepsilon}{4\pi\sigma} \int ds \qquad \text{[Equation 1]}$$

Where $\varepsilon_0$ indicates the permittivity of air, $\varepsilon$ indicates the permittivity of an electrolyte, $\sigma$ indicates the radius of electrolytic ions, and S indicates the specific surface area of an electrode.

The factors that determine the capacity of an electric double layer capacitor are as follows. As can be seen from Equation 1 above, the larger the specific surface area of the electrode, the larger the permittivity of the electrolyte, and the smaller the radius of the ions during the formation of the double layer, the greater the capacity that can be obtained. In addition, capacitance is determined by the internal resistance of the electrode, the relationship between the distribution of pores in the electrode and the electrolytic ions, internal voltage, etc.

The electric double layer capacitor includes electrodes, a separator, an electrolyte, current collectors, and a case.

The selection of materials for the electrodes is most important when configuring the capacitor. However, the capacitance of the capacitor is changed by various other components of the capacitor.

The materials for the electrodes must have high electrical conductivity and a large specific surface area. In addition, the materials for the electrodes must be electrochemically stable.

Another example of such an electric double layer device may be a battery.

The battery is a device that converts chemical energy, stored in a chemical material (i.e. an active material) contained therein, into electrical energy through an electrochemical oxidation-reduction reaction (redox reaction).

The battery is constituted by an assembly of two or more electrochemical cells. Alternatively, the battery may be constituted by a single cell. The battery is configured such that electrons flow to the outside along a conducting wire due to an electrochemical reaction, rather than a chemical reaction. The electrons flowing along the conducting wire becomes the source of electrical energy, thereby being electrically useful.

More specifically, the battery has a positive electrode (cathode) active material and a negative electrode (anode) active material coated on a current collector. The positive electrode and the negative electrode are separated from each other by a separator. In addition, the positive electrode and the negative electrode are contained in an electrolyte, which enables the transfer of ions between the two electrodes.

In order to operate an electric lamp, an apparatus, an instrument, etc., the electrode materials and electrolyte must be selected appropriately and arranged so as to have a specific structure such that sufficient voltage and current are generated between the two electrodes of the battery.

For example, a positive electrode, the positive electrode active material of which is reduced by electrons received from an external conducting wire, a negative electrode, the negative electrode active material of which is oxidized so as to emit electrons to the conducting wire, an electrolyte, which enables a material to move such that the reduction reaction of the positive electrode and the oxidation reaction of the negative electrode are chemically harmonious, and a separator, which prevents physical contact between the positive electrode and the negative electrode, must be arranged so as to convert chemical energy into electrical energy based on interactions therebetween.

The negative electrode of the battery, arranged as described above, basically emits electrons while being oxidized, and the positive electrode receives electrons while being reduced (together with positive ions). When the battery is operated in a state of being connected to an external load, therefore, the two electrodes are electrochemically changed to thus perform electrical work.

At this time, the electrons, which are generated by the oxidation reaction of the negative electrode, move to the positive electrode via the external load, and undergo a reduction reaction with the positive electrode active material. Consequently, the flow of charges is completed as the result of movement of anions (negative ions) and cations (positive ions) toward the negative electrode and the positive electrode in the electrolyte.

In this way, the reaction is performed in the electrolyte such that charges continuously flow in the external conducting wire, and the electrical operation is performed using the charges.

Based on the kind of an electrolytic solution, the battery may be classified as a liquid electrolyte battery or a polymer electrolyte battery. In general, the liquid electrolyte battery is referred to as a lithium ion battery, and the polymer electrolyte battery is referred to as a lithium polymer battery.

FIG. 1 is a schematic view showing the structure of a general electric double layer device, FIG. 2 is a schematic view illustrating a principle whereby an electric double layer capacitor, applied to a general electric double layer device, is charged, and FIG. 3 is a circuit diagram illustrating a principle whereby the electric double layer capacitor applied to the general electric double layer device is charged and discharged.

As shown in FIG. 1, a general electric double layer device 100 includes electrodes 10, an electrolytic solution 20, current collectors 30, a separator 40, a first lead terminal 61, and a second lead terminal 62.

On the assumption that the electric double layer device 100 is a battery, the chemical energy of a chemical material (i.e. an active material) therein is converted into electrical energy through an electrochemical oxidation-reduction reaction (redox reaction), and the electrodes 10, which are put on the current collectors 30, have a positive electrode and a negative electrode as the active material.

Describing the characteristics of the electric double layer device 100 in more detail based on the assumption that the electric double layer device 100 is a capacitor, on the other hand, energy is stored using the distribution of positive and negative charges which are arranged within a short distance from each other at the interface between the two different electrodes 10, the capacitance, in farads, is high, and the change, and deterioration in performance upon repeated charge and discharge cycles thereof are very low.

The electrodes 10 are made of activated carbon, which has a large specific surface area, and store charges generated at the electric double layer, which is disposed at the interface with the electrolytic solution 20. Of the electrical characteristics of the electrode 10, capacitance and internal resistance are the most important criteria in evaluating the performance thereof. Consequently, the electrodes 10 must exhibit low specific resistance and have a porous structure. In the porous structure, the size and distribution of pores must be simple and biased within a predetermined range. The material characteristics of the electrodes 10 most strongly affect the inherent charge and discharge characteristics of the electric double layer capacitor.

In recent years, therefore, an activated carbon-based material, which has a large specific surface area and is inexpensive, has been mainly used as the material for the electrodes 10, and research into the use of metal oxides and conductive polymers in order to increase energy density has been increasingly conducted.

Meanwhile, an organic solvent, quaternary ammonium salt (organic), or sulfuric acid solution (aqueous solution) is used as the electrolytic solution 20. For the organic solvent electrolytic solution, polycarbonate (PC) and ethyl methyl carbonate (EMC) or PC and dimethoxyethane (DME) may be mixed at a predetermined ratio in order to improve electrical conductivity.

An electric double layer capacitor 100 using an organic electrolytic solution has a capacitance per unit area of 4 to 6 $\mu F/cm2$. The electrical conductivity of the organic electrolytic solution is higher than that of the aqueous electrolytic solution. Consequently, the electric double layer capacitor 100 using the aqueous electrolytic solution has a capacitance per unit area of 5 to 10 $\mu F/cm2$, which is higher than that of the electric double layer capacitor 100 using the organic electrolyte. However, the electric double layer capacitor 100 using the aqueous electrolytic solution has problems in that the potential window is narrow and decomposition occurs.

Nonwoven fabric, porous polyethylene (PE), or polypropylene (PP) film is used as the separator 40.

The principle whereby the electric double layer capacitor is charged is as follows. As shown in FIG. 1, the two electrodes 10 are placed opposite the electrolytic solution 20 in a state in which the separator 40 is located therebetween. In a state in which electrical energy is not supplied from the outside, as shown in FIG. 2, which is a schematic view illustrating the principle whereby the electric double layer capacitor is charged, the electric double layer capacitor is in a bulk state, in which charges are non-uniformly distributed. As a result, the potential difference between the electrodes 10 becomes 0. When electrical energy is supplied from the outside, as shown in FIG. 3, which is a circuit diagram illustrating the principle whereby the electric double layer capacitor is charged and discharged, charges are uniformly distributed throughout the electric double layer capacitor. As a result, as shown in FIG. 2, an energy having voltage corresponding to a potential difference of $2\Phi 1$ is charged between the two electrodes 10.

At this time, even when the supply of electrical energy is interrupted, the electric double layer, which has already been formed, is not extinguished, and therefore the charged electrical energy is retained.

Related Art Document 1 (10-2008-0044054: Module Type Electric Double Layer Capacitor and Method of Manufacturing the Same)

FIG. 4 is a view showing a process of manufacturing an electric double layer capacitor according to Related Art Document 1, FIG. 5 is a view illustrating a method of manufacturing an integrated electric double layer capacitor according to Related Art Document 1, and FIG. 6 is a view illustrating a process of manufacturing an electrode device that constitutes the electric double layer capacitor according to Related Art Document 1.

In general, a secondary battery that can be charged and discharged, for example, an energy storage apparatus, such as an electrolytic condenser or an electrochemical double layer capacitor (EDLC), is configured to have a wound type structure, e.g. a jelly-roll type structure.

As shown in FIG. 4, a wound type energy storage apparatus, such as a wound type electrochemical double layer capacitor, generally includes a cylindrical case 20 made of aluminum (Al) and a wound device 10 mounted in the case 20.

The wound device 10 is formed by winding a strip-shaped electrode stack, that is, positive and negative electrode devices with an electrolyte interposed between the positive and negative electrode devices, in a cylindrical shape and taping the outside of the strip shaped electrode stack in order to prevent the strip-shaped electrode stack from being unwound.

The wound device 10 formed as described above is impregnated with an electrolytic solution, and is mounted in the cylindrical case 20. A terminal plate 30 is installed above the wound device 10, and lug- or screw-type external terminals 40 are fastened to the terminal plate 30.

In addition, a neck 21, which prevents the terminal plate 30 from being pushed downward, is formed in the upper part of the case 20 in a depressed state. The wound device 10 is mounted in the case 20 after the neck 21 is formed in the case 20. The wound device 10 is electrically connected to the external terminals 40 via terminals 120. Subsequently, an upper end 22 of the case 20 is curled. As a result, the terminal plate 30 is fixed in the case 20, and the assembly process is completed.

Referring to the upper part of FIG. 6, an electrode device 100 includes an electrode current collection sheet 111 made of general aluminum foil and an electrode active material 112 applied to the current collection sheet 111.

The electrode active material 112 is formed by applying conductive paste including mostly activated carbon.

The terminal 120 is coupled to the electrode device 100. Specifically, a portion of the electrode device 100 to which the terminal 120 will be coupled is scratched to remove the electrode active material 112 therefrom, the scratched portion of the electrode device 100 is drilled, and the terminal 120 is coupled to the drilled portion of the electrode device 100 by riveting.

The applicant of the present application has improved the electric double layer device having the above-mentioned characteristics, and proposes the improved electric double layer device as the present invention.

Related Art Document 2 (10-2013-0065485: Electric Double Layer Device and Wound Unit for the Same)

FIG. 7 is an exploded perspective view showing an electric double layer device according to Related Art Document 2, FIG. 8 is a sectional view showing the electric double layer device according to Related Art Document 2, FIG. 9A is a plan view showing a wound unit for the electric double layer device according to Related Art Document 2, and FIG. 9B is a half-sectional view showing the wound unit for the electric double layer device according to Related Art Document 2.

As shown in FIGS. 7 to 9B, the electric double layer device according to Related Art Document 2 includes a wound unit 10, which includes a first current collector 11 and a second current collector 12, which are wound while being separated from each other by a separator 10a, and a case 20 having an upper opening 21, through which the wound unit 10 is received, and a lower closure 22.

More specifically, as shown in FIGS. 7 to 9B, the electric double layer device according to Related Art Document 2 further includes a lower connection plate connected to the first current collector 11 of the wound unit 10, a lower insulating plate 32 placed on the lower closure 22 while receiving the lower connection plate 31, a connection core 40 connected to the lower connection plate 31 while being exposed upward in a state in which the connection core 40 is upright along the center of the wound unit 10, one terminal 50a extending upward from an upper collecting plate 50 connected to the second current collector 12 of the wound unit 10, the upper collecting plate 50 having therein a center hole 51, through which the connection core 40 extends, an upper insulating plate 60 fitted on the upper collecting plate 50 excluding the one terminal 50a, the upper insulating plate 60 having therein a through hole 61, through which the connection core 40 extends, and the other terminal 70a connected to the upper end of the connection core 40, the other terminal 70a extending upward while being spaced apart from the one terminal 50a.

The connection core 40 is perpendicularly connected to the lower connection plate 31, which is connected to the first current collector 11, and then the other terminal 70a is connected to the connection core 40 and is withdrawn. The upper collecting plate 50 is connected to the second current collector 12, and then the one terminal 50a is withdrawn. The one terminal 50a and the other terminal 70a are withdrawn upward.

Furthermore, the wound unit 10 for the electric double layer device according to Related Art Document 2 includes a first current collector 11 and a second current collector 12, which are wound while being separated from each other by a separator 10a, a lower connection plate 31 connected to the first current collector 11, a connection core 40 connected to the lower connection plate 31 while being exposed upward in a state in which the connection core 40 is upright along the center of the first current collector 11 and the second current collector 12, which are wound while being separated from each other by the separator 10a, and one terminal 50a extending upward from an upper collecting plate 50 connected to the second current collector 12 of the wound unit 10, the upper collecting plate 50 having therein a center hole 51, through which the connection core 40 extends.

The one terminal 50a may extend upward from the upper collecting plate 50 and may then be bent. The other terminal 70a may be connected to the upper end of the connection core 40 such that the other terminal 70a is spaced apart from the one terminal 50a. In addition, the other terminal 70a may extend upward and may then be bent.

The lower connection plate 31 is connected to the first current collector 11 of the wound unit 10 in a state in which the connection core 40 is upright along the center of the first current collector 11, for example, such that a negative electrode of the first current collector 11 is withdrawn upward through the connection core 40.

The one terminal 50a is connected to the second current collector 12 of the wound unit 10 in a state in which the one terminal 50a extends upward from the upper collecting plate 50, which has therein the center hole 51 through which the connection core 40 extends, for example, such that a positive electrode of the second current collector 12 is withdrawn upward. The other terminal 70a is connected to the upper end of the connection core 40 while extending upward such that the other terminal 70a is spaced apart from the one terminal 50a.

At this time, the upper insulating plate 60 is fitted on the upper collecting plate 50 excluding the one terminal 50a such that the one terminal 50a is exposed outward.

The electric double layer device according to Related Art Document 2 may further include an upper nonconductive plate 80 fitted in the case 20 to cover the upper opening 21, the upper nonconductive plate 80 having a first connection terminal 81 and a second connection terminal 82 respectively connected to the other terminal 70*a* and the one terminal 50*a*.

In the electric double layer device according to Related Art Document 2, however, the connection between the other terminal 70*a* and the connection core 40 is frequently poor since the other terminal 70*a* is connected to the upper end of the connection core 40 while extending upward. In particular, a plurality of components, such as the connection core 40 and the other terminal 70*a*, is needed, which make it difficult to perform assembly and connection. As a result, productivity and ease of assembly are considerably reduced. Furthermore, the connection core 40 increases the weight of the electric double layer device.

RELATED ART DOCUMENT

Patent Document (Patent Document 1) Related Art Document 1 (10-2008-0044054: Module type electric double layer capacitor and method of manufacturing the same)
(Patent Document 2) Related Art Document 2 (10-2013-0065485: Electric double layer device and wound unit for the same)

Therefore, the present invention has been made in view of the above problems, and it in desirable to provide an electric double layer device configured such that a lower terminal is directly withdrawn from a lower collecting plate in the same manner as the manner in which an upper terminal is directly withdrawn from an upper collecting plate, thereby improving productivity and ease of assembly, and in addition increasing connection force.

It is also desirable to provide an electric double layer device configured such that a lower terminal is directly withdrawn from a lower collecting plate, thereby improving discharge efficiency during the discharge of high current while reducing internal equivalent resistance.

It is also desirable to provide an electric double layer device further including an upper insulating ring configured to enable a lower terminal to maintain a state in which a wound unit and a case are spaced apart from each other, thereby more securely insulating the lower terminal and, in addition, making it easier to insert the wound unit into the case.

In accordance with an aspect of the present invention, the above and other objects can be accomplished by the provision of an electric double layer device including a wound unit, which includes a first current collector and a second current collector, which are wound while being separated from each other by a separator, and a case having an upper opening, through which the wound unit is received, and a lower closure, wherein the electric double layer device further includes a lower collecting plate connected to the first current collector of the wound unit, the lower collecting plate having a lower terminal extending upward along the outer circumference of the wound unit, a lower insulating plate placed on the lower closure to receive the lower collecting plate, an upper collecting plate connected to the second current collector of the wound unit, the upper collecting plate having an upper terminal extending upward, an upper insulating plate fitted on the upper collecting plate such that the upper terminal and the lower terminal are directed upward, and an upper nonconductive plate fitted in the case to cover the upper opening, the upper nonconductive plate having a first connection terminal and a second connection terminal respectively connected to the lower terminal and the upper terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

An exemplary embodiment of an electric double layer device according to the present invention will be described in detail with reference to the accompanying drawings. A plurality of embodiments may be provided. The objects, features, and advantages of the present invention will be more clearly understood from the following detailed description of the embodiment.

Figure 13A:
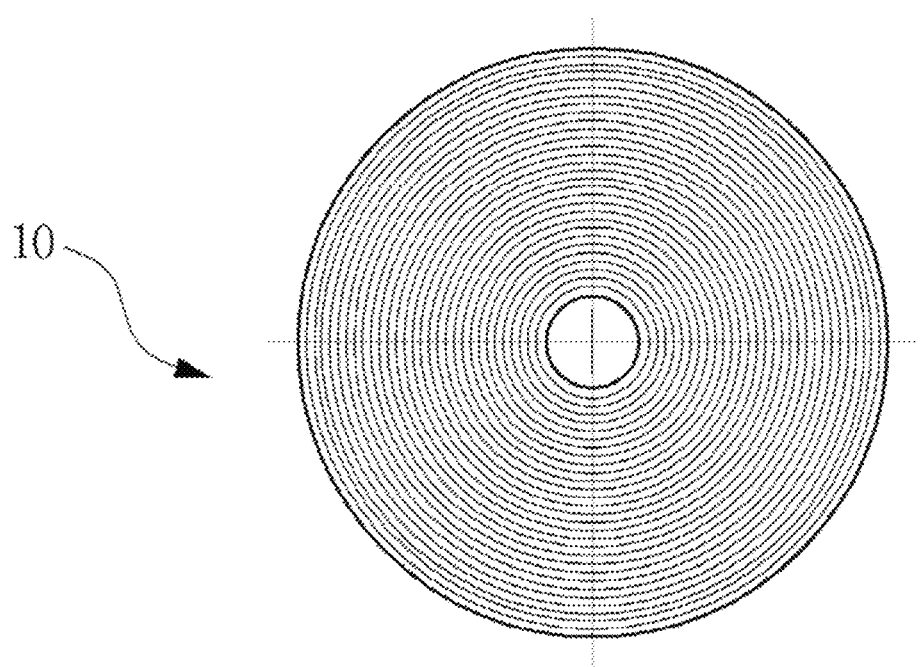
FIG. 13A is a plan view showing a wound unit that is applied to the electric double layer device according to the present invention.
Figure 13B:
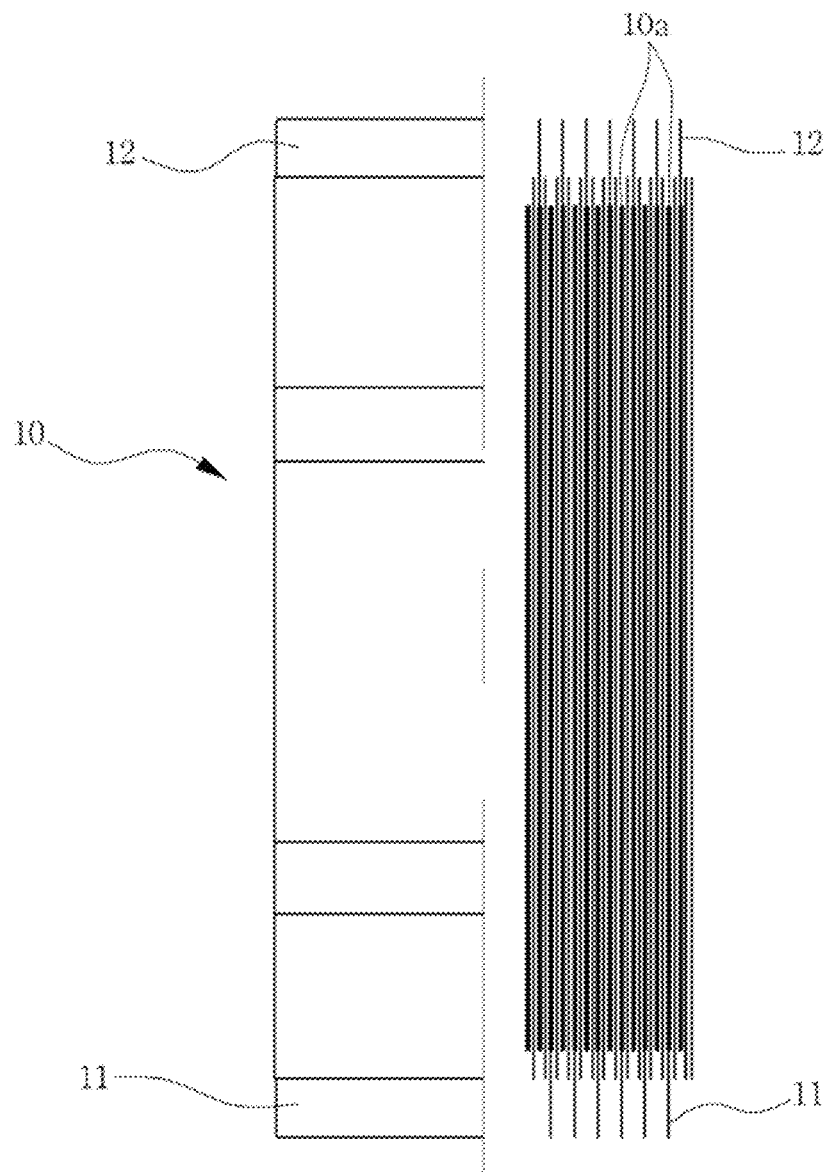
FIG. 13B is a half-sectional view showing the wound unit that is applied to the electric double layer device according to the present invention.
Figure 13C:
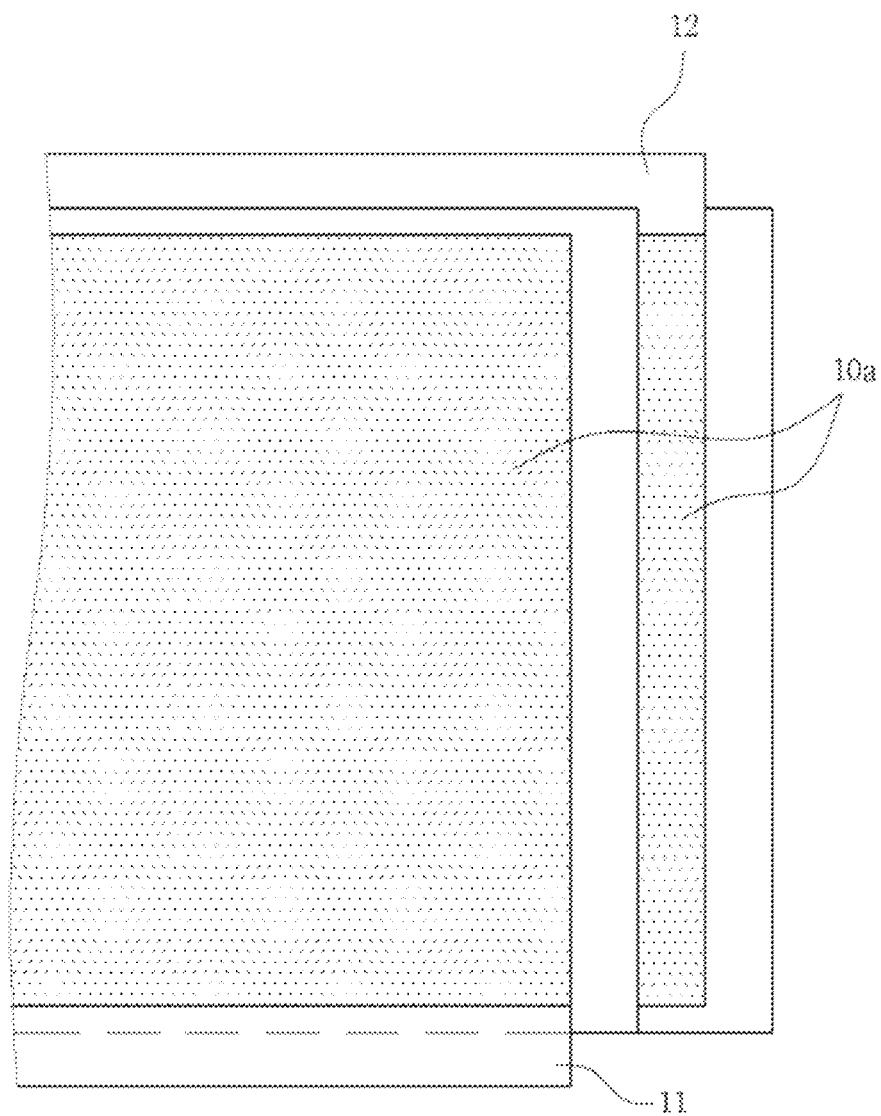
FIG. 13C is a development view showing the wound unit that is applied to the electric double layer device according to the present invention.

FIG. 13A is a plan view showing a wound applied to an electric double layer device according to the present invention, FIG. 13B is a half-sectional view showing the wound unit that is applied to the electric double layer device according to the present invention, and FIG. 13C is a development view showing the wound unit that is applied to the electric double layer device according to the present invention.

As shown in FIGS. 13A to 13B, a wound unit 10 that is applied to an electric double layer device according to the present invention is configured to have a structure in which a first current collector 11 and a second current collector 12 are wound such that the first current collector 11 extends downward and the second current collector 12 extends upward in a state in which a separator 10a is disposed between the first current collector 11 and the second current collector 12. For example, the first current collector 11 may be a negative electrode, and the second current collector 12 may be a positive electrode. Alternatively, the first current collector 11 may be a positive electrode, and the second current collector 12 may be a negative electrode.

Figure 10:
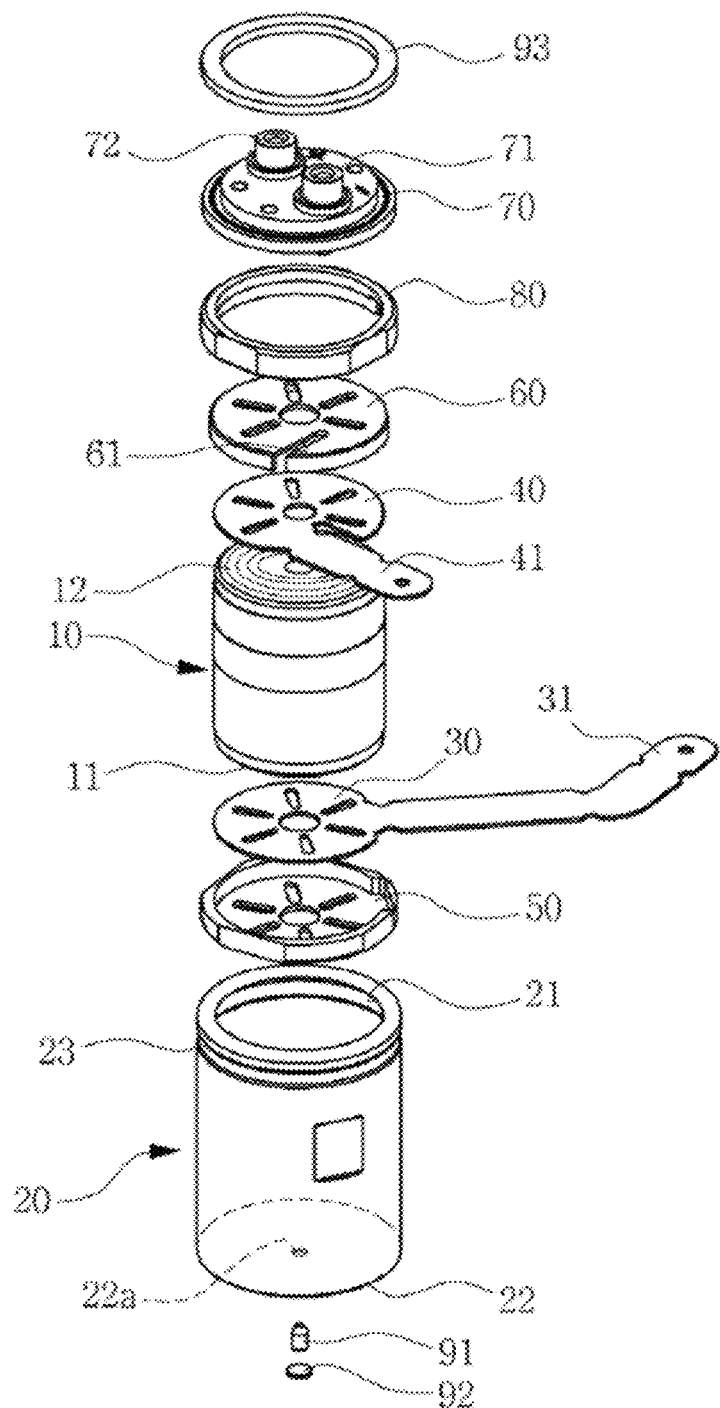
FIG. 10 is an exploded perspective view showing an electric double layer device according to the present invention.
Figure 11A:
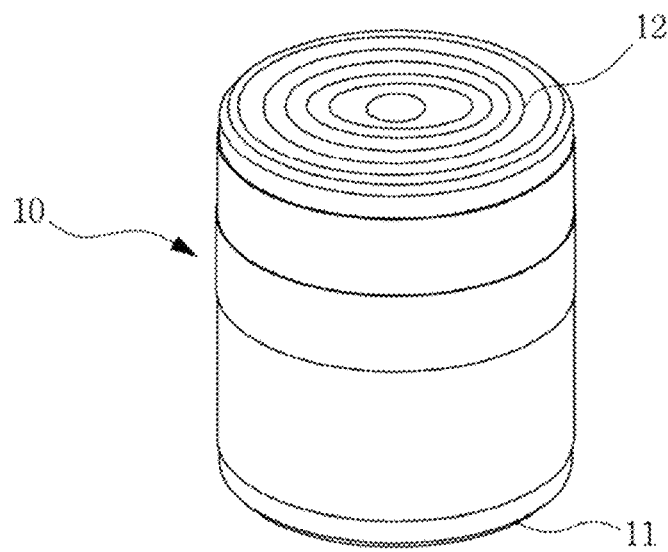
FIGS. 11A to 11K are perspective views showing a process of assembling the electric double layer device according to the present invention.
Figure 11B:
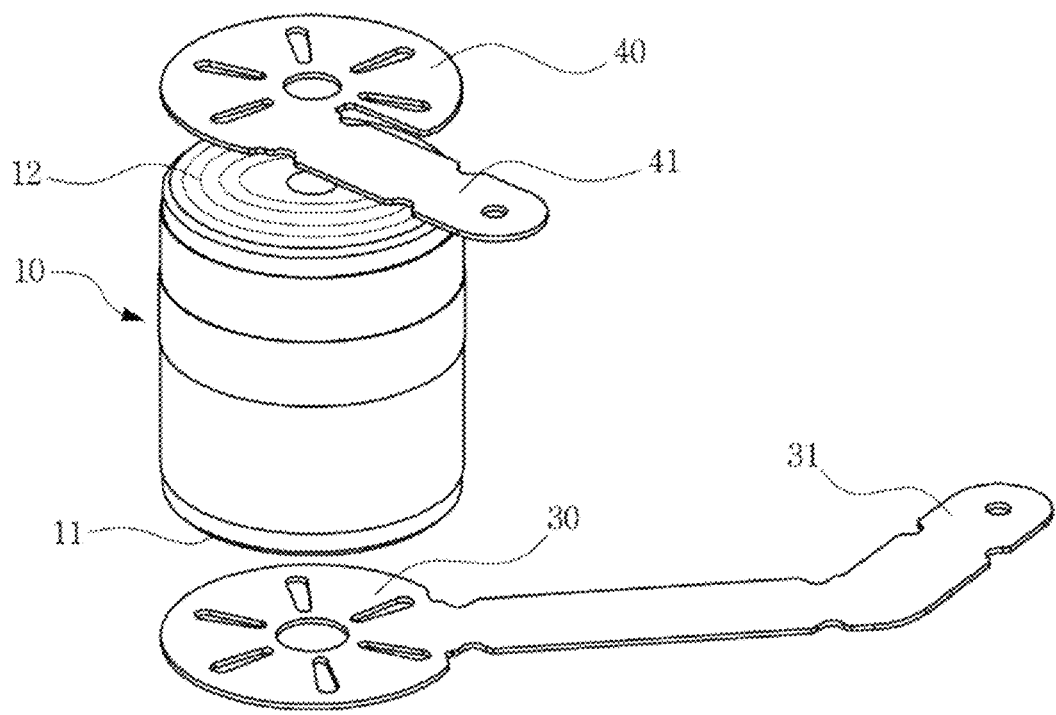
Figure 11C:
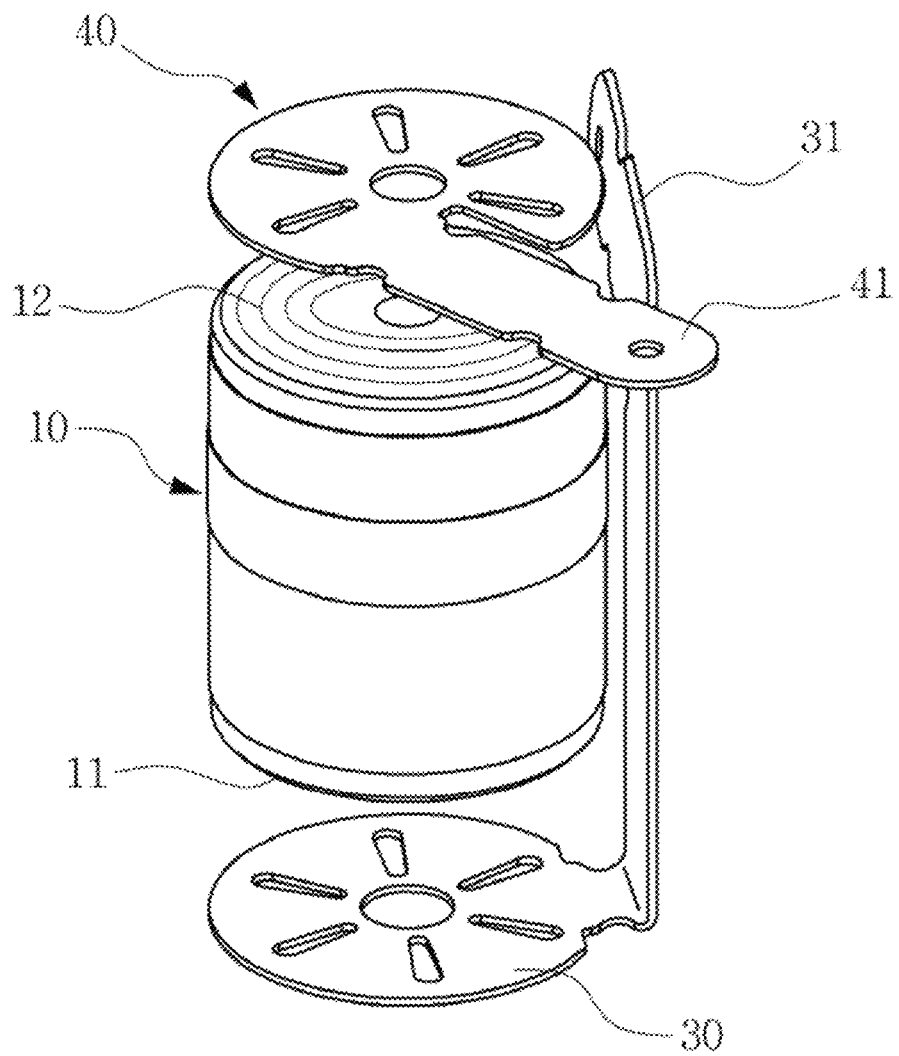
Figure 11D:
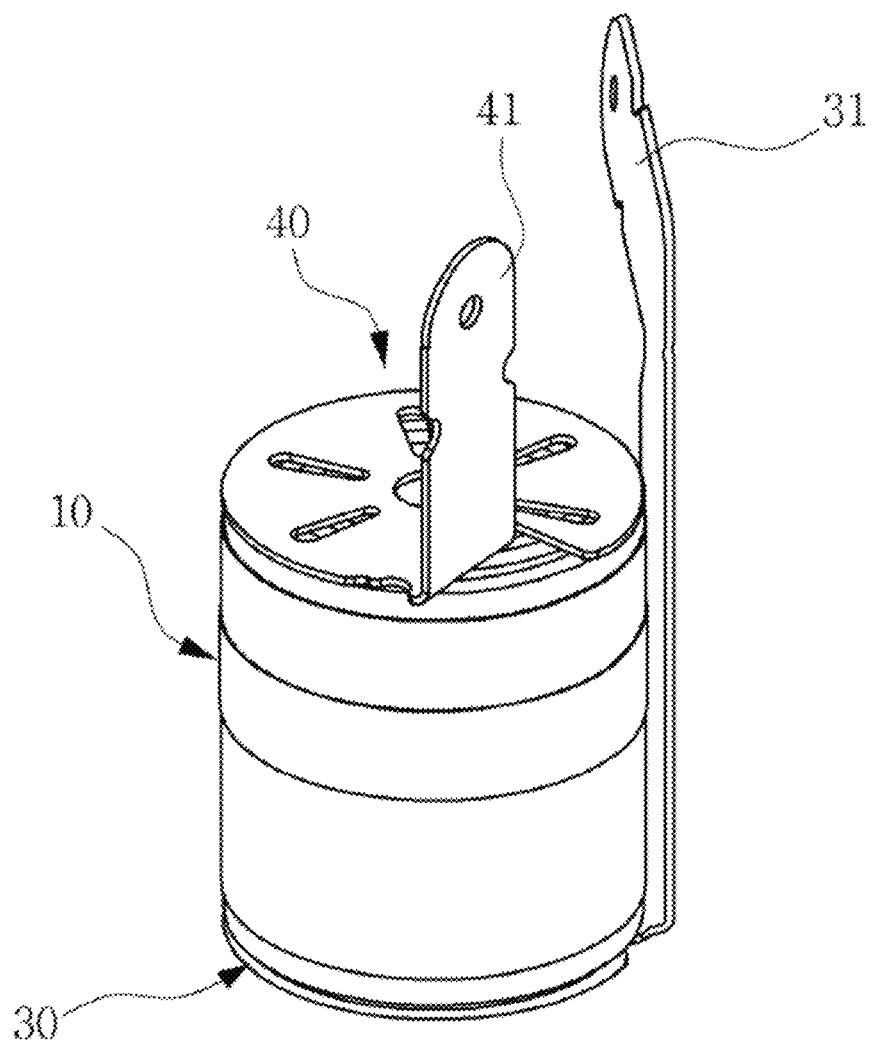
Figure 11E:
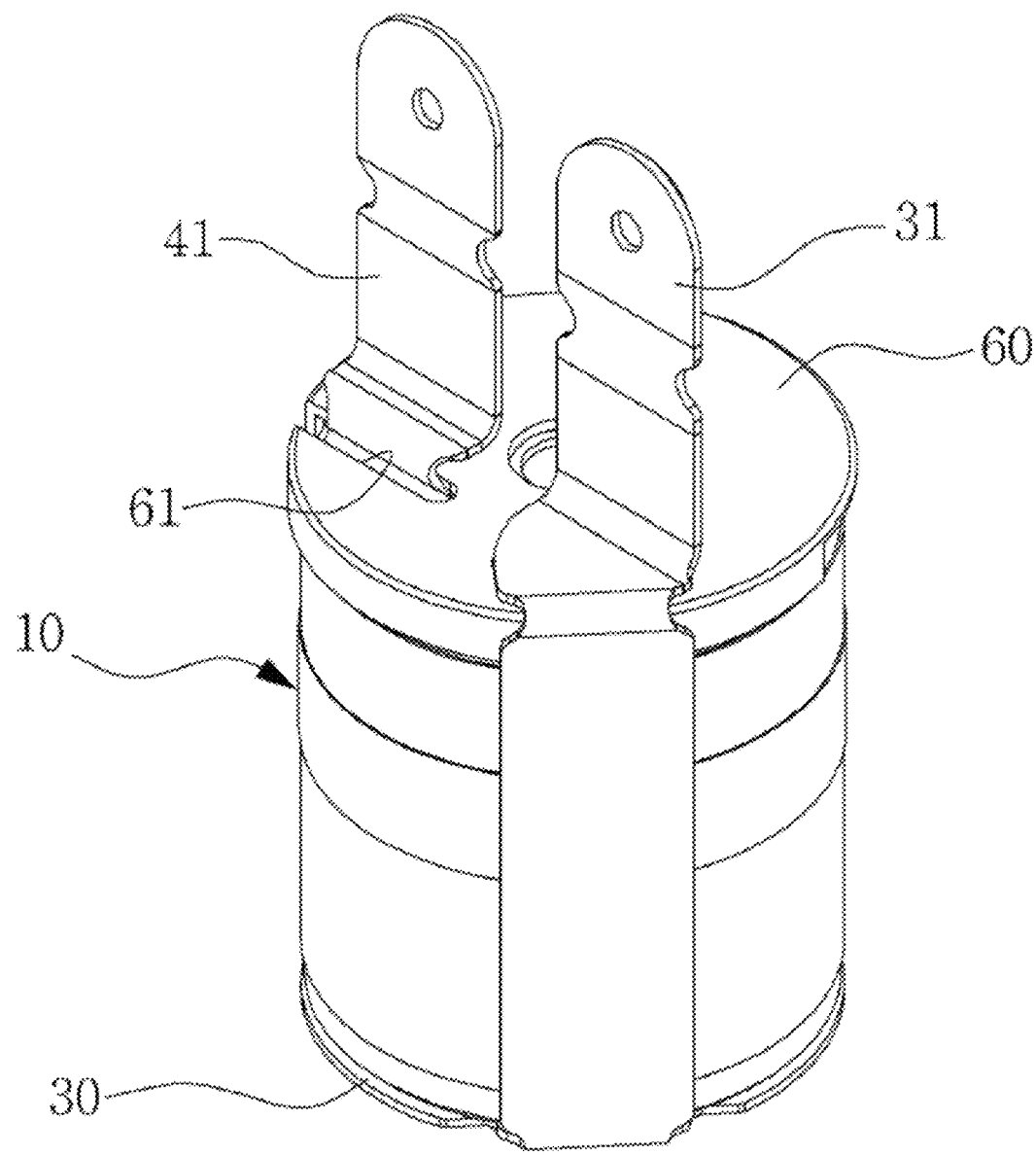
Figure 11F:
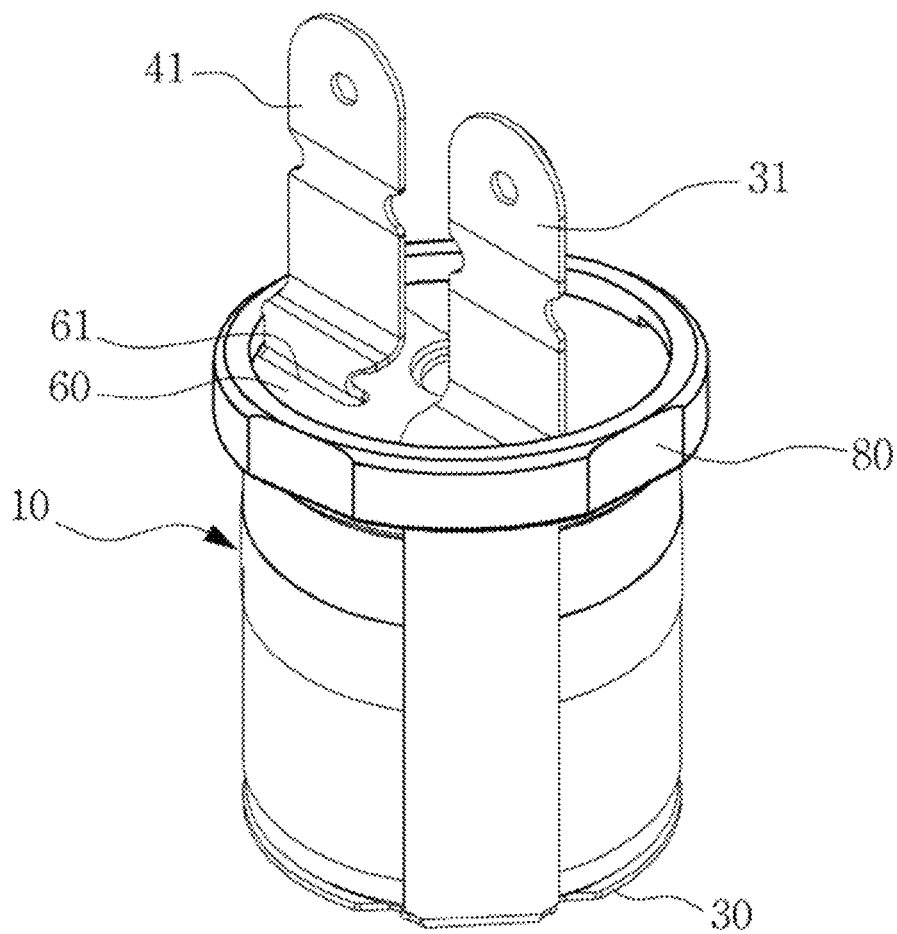
Figure 11G:
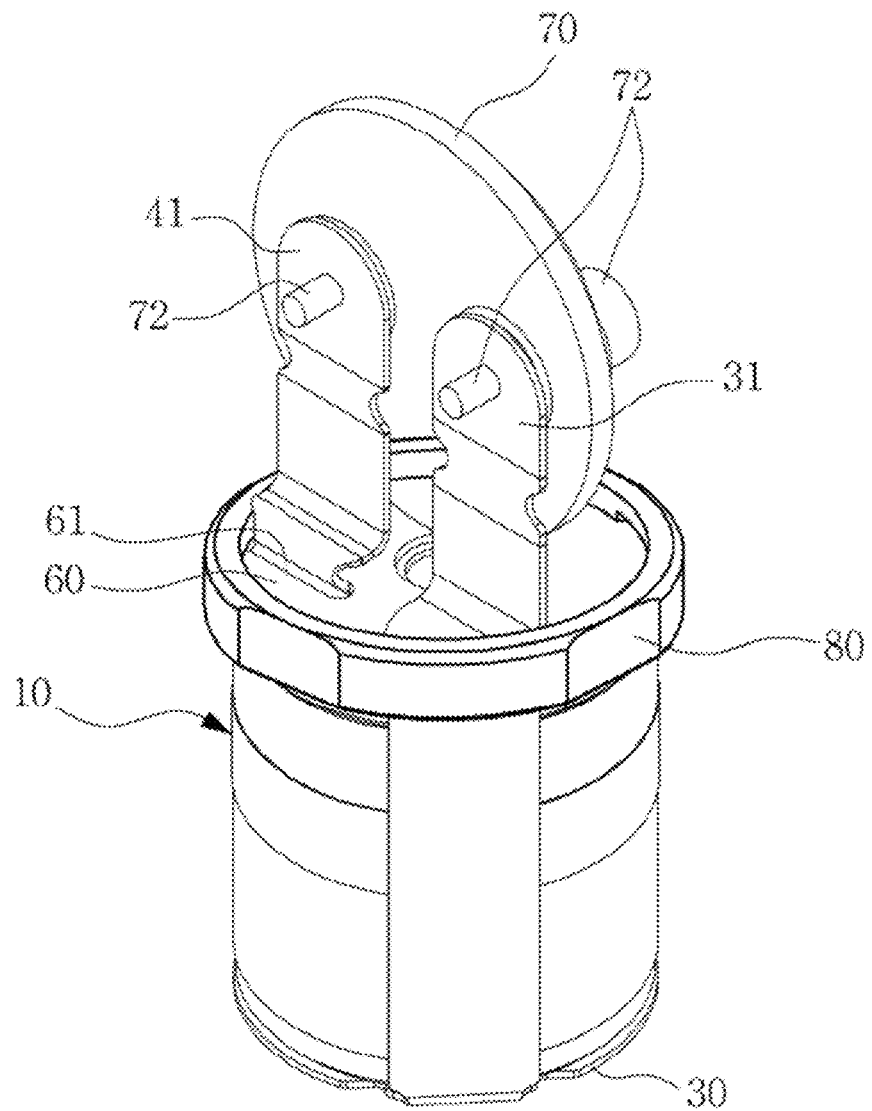
Figure 11H:
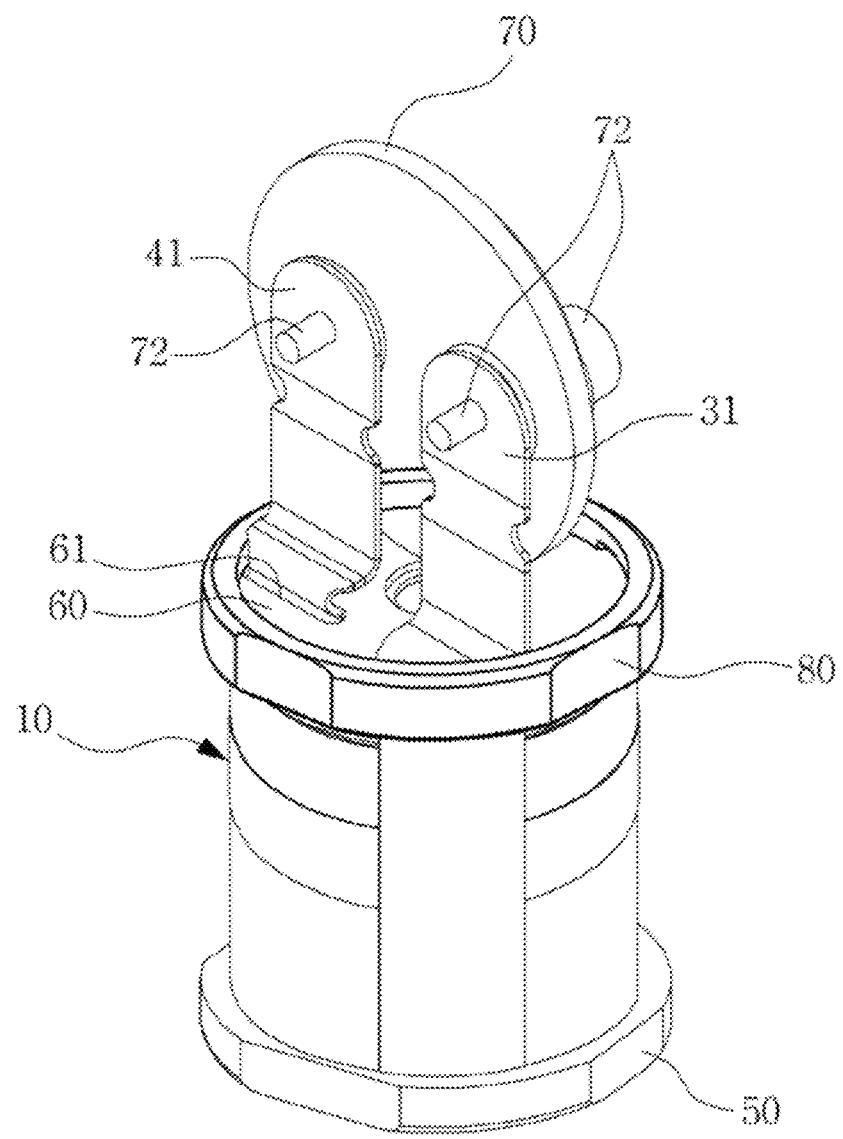
Figure 11I:
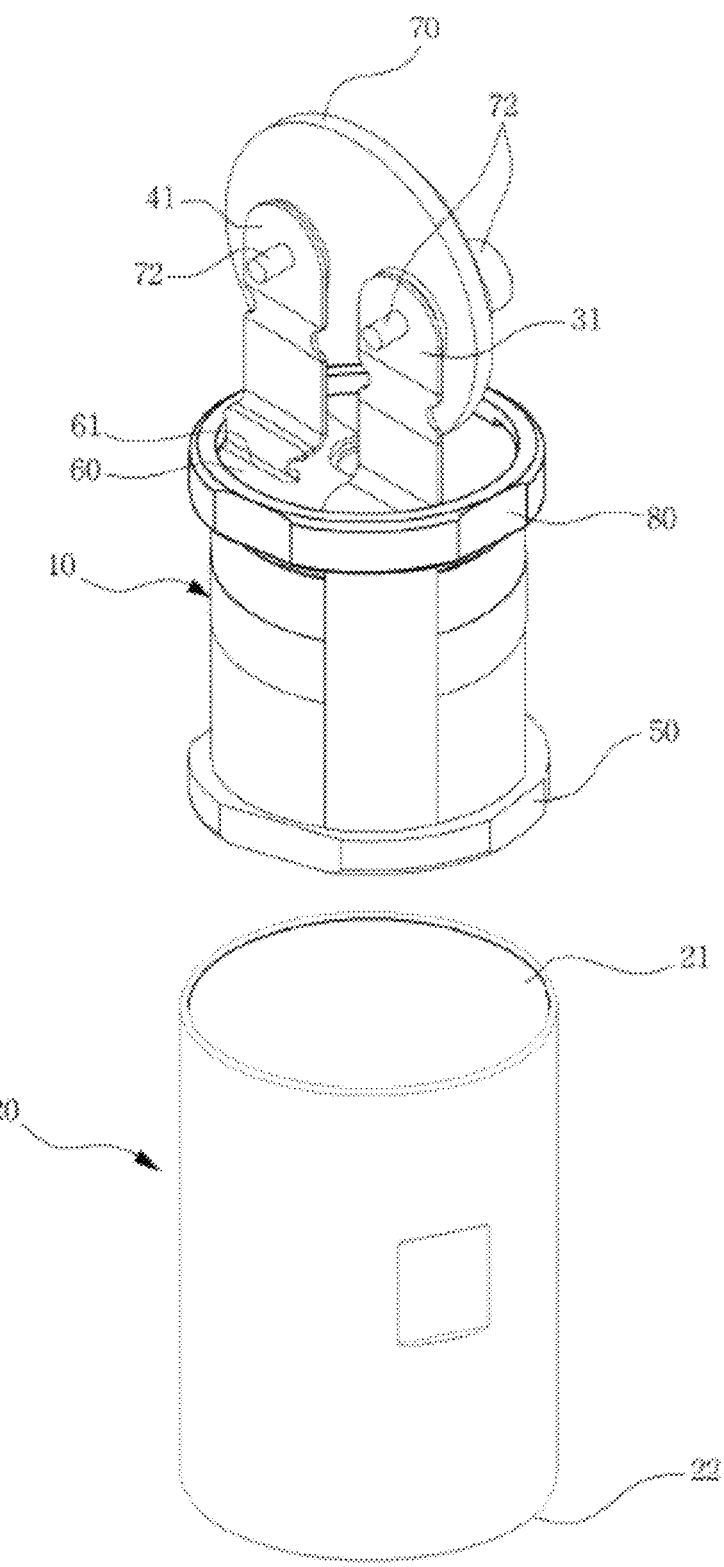
Figure 11J:
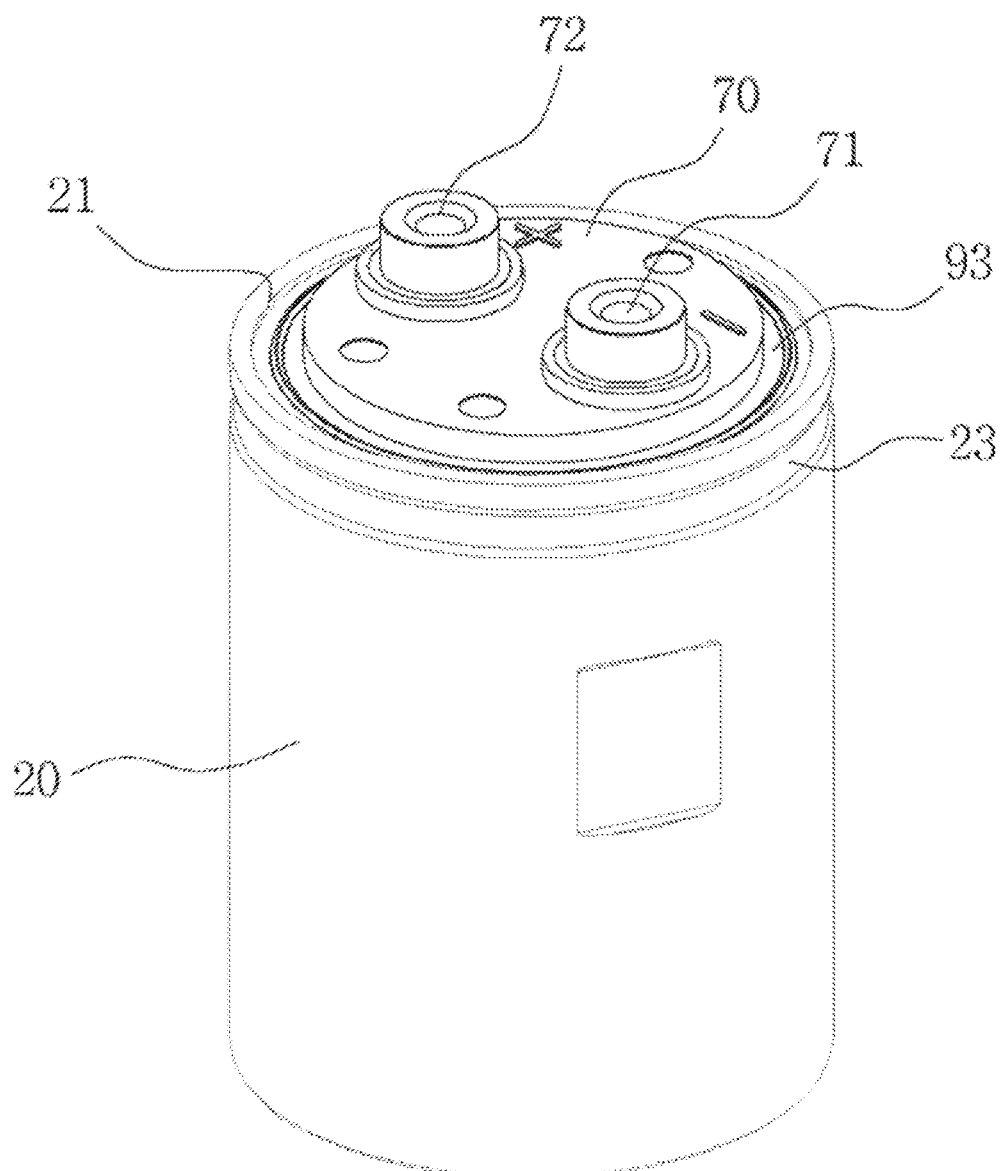
Figure 11K:
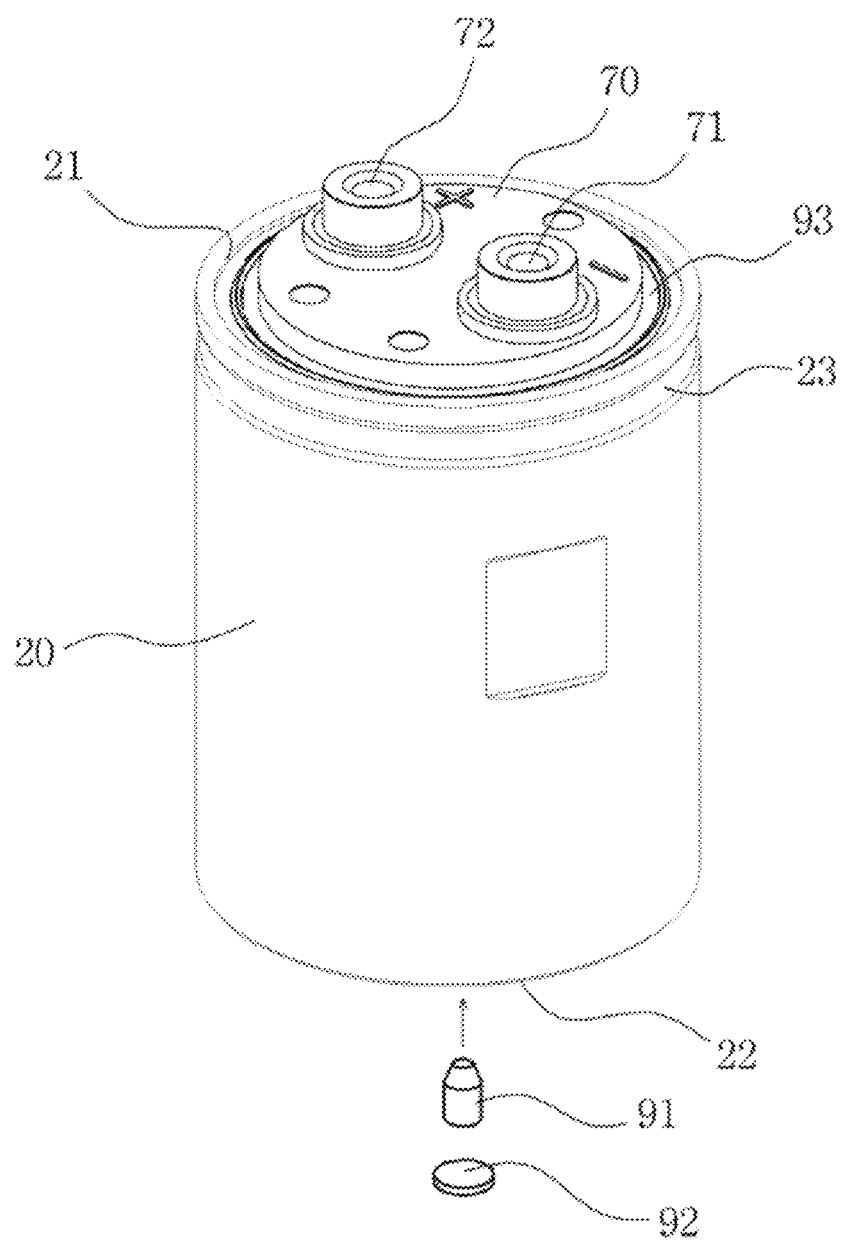
Figure 12:
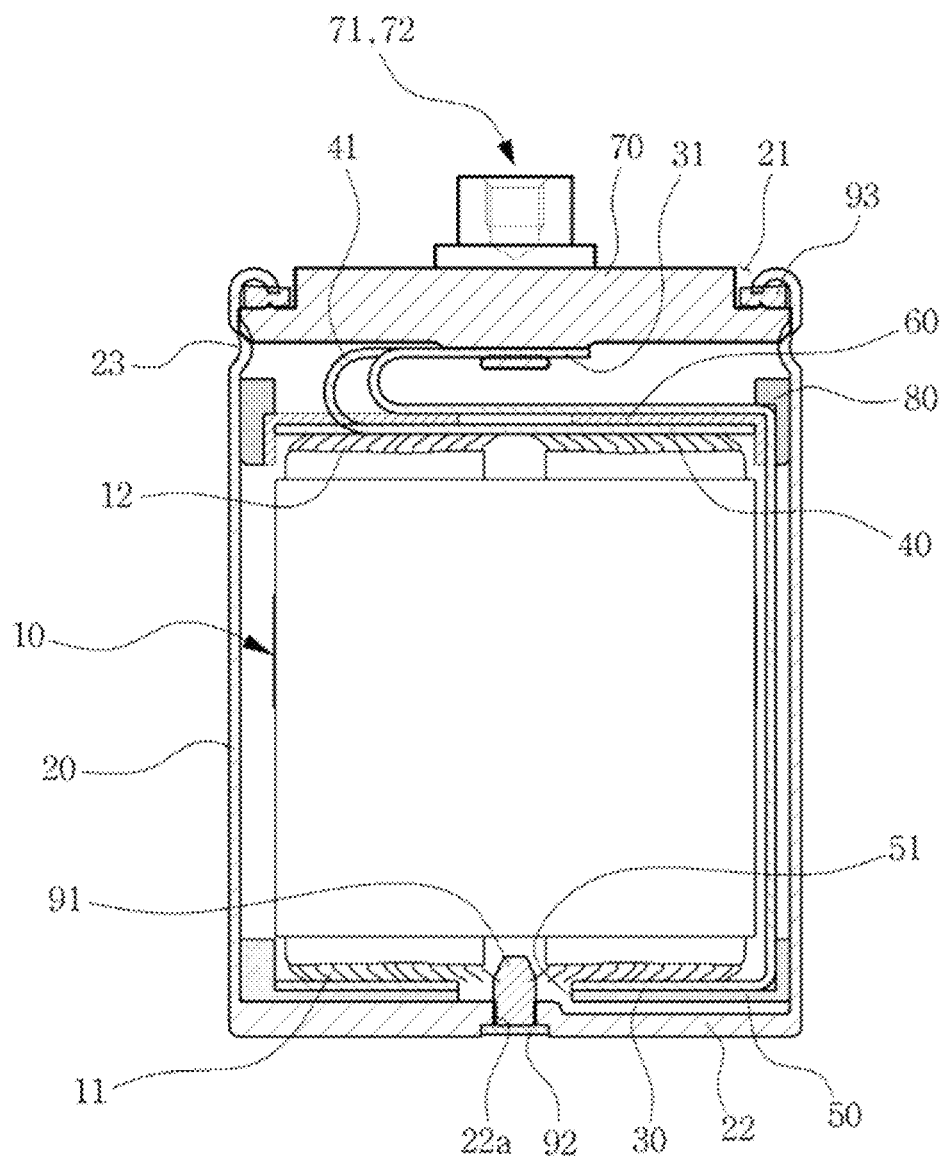
FIG. 12 is a sectional view showing the electric double layer device according to the present invention.

FIG. 10 is an exploded perspective view showing an electric double layer device according to the present invention, FIGS. 11A to 11K are perspective views showing a process of assembling the electric double layer device according to the present invention, and FIG. 12 is a sectional view showing the electric double layer device according to the present invention.

As shown in FIGS. 10 to 13C, the electric double layer device according to the present invention basically includes a wound unit 10, which includes a first current collector 11 and a second current collector 12, which are wound while being separated from each other by a separator 10a, and a case 20 having an upper opening 21, through which the wound unit 10 is received, and a lower closure 22.

More specifically, the electric double layer device according to the present invention further includes a lower collecting plate 30 connected to the first current collector 11 of the wound unit 10, the lower collecting plate 30 having a lower terminal 31 extending upward along the outer circumference of the wound unit 10, a lower insulating plate 50 placed on the lower closure 22 to receive the lower collecting plate 30, an upper collecting plate 40 connected to the second current collector 12 of the wound unit 10, the upper collecting plate 40 having an upper terminal 41 extending upward, an upper insulating plate 60 fitted on the upper collecting plate 40 such that the upper terminal 41 and the lower terminal 31 are directed upward, and an upper nonconductive plate 70 fitted in the case 20 to cover the upper opening 21, the upper nonconductive plate 70 having a first connection terminal 71 and a second connection terminal 72 respectively connected to the lower terminal 31 and the upper terminal 41.

The lower terminal 31 is withdrawn from the lower collecting plate 30, which is connected to the first current collector 11, and extends upward. As a result, components such as the connection core and the other terminal, disclosed in Related Art Document 2, are not needed. Consequently, it is possible to omit the process of connecting the connection core to the lower connection plate and the process of connecting the other terminal to toe connection core, which are required in Related Art Document 2, thereby improving productivity and ease of assembly. In addition, the lower terminal 31 is withdrawn from the lower collecting plate 30 in the same manner as the manner in which the upper terminal 41 is withdrawn from the upper collecting plate 40, thereby preventing the risk of a poor connection therebetween. In particular, internal equivalent resistance is reduced, and discharge efficiency is improved during the discharge of high current.

In addition, the connection terminal 71 and the second connection terminal 72 are more securely positioned by the upper nonconductive plate thereby more smoothly achieving connection with an external apparatus.

Furthermore, the wound unit 10 for the electric double layer device according to the present invention includes a first current collector 11 and a second current collector 12, which are wound while being separated from each other by a separator 10a. More specifically, the lower terminal 31 extends upward along the outer circumference of the wound unit 10, is bent so as to be placed above the upper insulating plate 60, and is then bent upward so as to be connected to the first connection terminal 71. The upper insulating plate 60 has therein a through hole 61 through which the upper terminal 41 extends. The upper terminal 41 extends upward from the upper collecting plate 40, extends through the through hole 61, and is then bent so as to be connected to the second connection terminal 72.

That is, the lower terminal 31 and the upper terminal 41 are directly withdrawn respectively from the lower collecting plate 30 and the upper collecting plate 40 without welding, thereby improving productivity and ease of assembly and increasing electrical connection force.

The upper terminal 41 and the lower terminal 31 may be connected to an external apparatus, such as a cellular phone, a GPS receiver, or an MP3 player. Alternatively, the upper terminal 41 and the lower terminal 31 may be connected to a wind energy system, a solar energy system, or a motor of an electric vehicle or a hybrid electric vehicle.

In addition, the electric double layer device according to the present invention further includes an upper insulating ring 80, disposed so as to be in tight contact with the edge of the upper insulation plate 60 while receiving the lower terminal 31 therein to enable the lower terminal 31 to maintain a state in which the wound unit 10 and the case 20 are spaced apart from each other, thereby more securely insulating the lower terminal 31.

In particular, the wound unit 10 may be more easily inserted into the case 20, since the upper insulating ring 80 enables the lower terminal 31 to be disposed in tight contact with the edge of the upper insulation plate 60.

The electric double layer device according to the present invention further includes a first through hole 22a and a second through hole 51 formed respectively through the lower closure 22 of the case 20 and the lower insulating plate 50 so as to be used as introduction ports of an electrolytic solution, a rubber plug 91 fitted in the upper part of the first through hole 22a to seal the first through hole 22a, and a closure plug 92 fitted in the lower part of the first through hole 22a and welded to the lower part of the first through hole 22a. The closure plug 92 may be made of aluminum. In a state in which all parts, including the wound unit 10, are assembled in the case 20, therefore, an electrolytic solution is introduced into the case 20 via the first through hole 22a and the second through hole 51, and the first through hole 22a is sealed, thereby improving productivity and ease of assembly.

Meanwhile, the electric double layer device according to the present invention may further include curling rubber 93 placed on the edge of the upper nonconductive plate 70 to seal the upper opening 21 after curling of the case 20, thereby sealing the interior of the case 20.

In addition, the electric double layer device according to the present invention may further include a beading part 23 provided at the upper part of the case 20 to maximize firmness between the upper nonconductive plate 70, including the upper terminal 41 and the lower terminal 31, and the case 20.

As is apparent from the above description, according to the present invention, the lower terminal is directly withdrawn from the lower collecting plate in the same manner as the manner in which the upper terminal is directly withdrawn from the upper collecting plate, thereby improving productivity and ease of assembly, and in addition increasing connection force.

According to the present invention, the lower terminal is directly withdrawn from the lower collecting plate, thereby improving discharge efficiency during the discharge of high current while reducing internal equivalent resistance.

According to the present invention, the electric double layer device further includes an upper insulating ring, configured to enable the lower terminal to maintain a state in which the wound unit and the case are spaced apart from each other, thereby more securely achieving insulation of the lower terminal.

According to the present invention, the upper insulating ring enables the lower terminal to be disposed in tight contact with the edge of the upper insulation plate, whereby the wound unit is more easily inserted into the case.

According to the present invention, an electrolytic solution is introduced into the case via a first through hole and a second through hole in a state in which all parts, including the wound unit, are assembled in the case, thereby improving productivity and workability.

The present invention may be applied to the field of devices such as a battery, a capacitor, and an electrolytic condenser, which store electrical energy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electric double layer device comprising:
    an electrode unit comprising a first current collector and a second current collector separated from each other by a separator;
    a case comprising an upper opening and a lower closure;
    a lower collecting plate connected to the first current collector, the lower collecting plate having a lower terminal extending toward the upper opening along an outer circumference of the electrode unit, wherein the lower terminal includes a bottom surface facing the electrode unit;
    a lower insulating plate placed on the lower closure of the case to receive the lower collecting plate;
    an upper collecting plate connected to the second current collector, the upper collecting plate having an upper terminal extending toward the upper opening;
    an upper insulating plate placed over the upper collecting plate, wherein the upper insulating plate includes a first surface facing the electrode unit and a second surface facing the upper opening, wherein the first surface of the upper insulating plate is in direct physical contact with the upper collecting plate, and wherein the second surface of the upper insulating plate is in direct physical contact with the bottom surface of the lower terminal of the lower collecting plate; and
    an upper nonconductive plate fitted in the case to cover the upper opening, the upper nonconductive plate having a first connection terminal and a second connection terminal respectively connected to the lower terminal and the upper terminal.

2. The electric double layer device according to claim 1, further comprising:
    a first through hole and a second through hole formed respectively through the lower closure of the case and the lower insulating plate;
    a rubber plug fitted in an upper part of the first through hole to seal the first through hole; and
    a closure plug fitted in a lower part of the first through hole.

3. The electric double layer device according to claim 1, wherein:
    the lower terminal is bent so as to be placed above the upper insulating plate, and is bent upward so as to be connected to the first connection terminal,
    the upper insulating plate has therein a through hole, through which the upper terminal extends, and
    the upper terminal is bent so as to be connected to the second connection terminal.

4. The electric double layer device according to claim 3, wherein each of the upper and lower terminals includes a U-shaped portion.

5. The electric double layer device of claim 3, further comprising an upper insulating ring in physical contact with an edge of the upper insulation plate.

6. The electric double layer device according to claim 1, wherein the upper and lower terminals are respectively integrally formed with the upper and lower collecting plates.

7. The electric double layer device according to claim 1, wherein the upper insulating plate is configured to press the upper collecting plate toward the electrode unit.

8. The electric double layer device according to claim 1, wherein the upper collecting plate includes a body portion from which the upper terminal extends, and wherein the body portion is covered by the first surface of the upper insulating plate.

9. The electric double layer device according to claim 8, wherein the upper insulating plate has a through-hole through which the upper terminal passes so as to be exposed from the upper insulating plate.

10. The electric double layer device according to claim 1, further comprising an upper insulating ring surrounding the upper insulating plate and configured to press a portion of the lower terminal of the lower collecting plate against the upper insulating plate.

11. The electric double layer device according to claim 1, wherein the upper and lower terminals of the upper and lower collecting plates respectively include first and second through-holes foamed at their ends thereof and configured to respectively receive the first and second connection terminals to respectively connect the lower and upper terminals of the upper and lower collecting plates to the first and second connection terminals.

12. The electric double layer device according to claim 1, wherein the lower terminal includes a folded portion disposed between the electrode unit and the upper opening of the case.

13. The electric double layer device according to claim 12, wherein the folded portion includes an upper portion and a lower portion that overlap each other in a direction extending from the lower closure to the upper opening.

14. The electric double layer device according to claim 1, wherein the electrode unit is a winding type electrode unit.

15. The electric double layer device according to claim 1, wherein the upper insulating plate surrounds side surfaces of the second current collector.

16. The electric double layer device according to claim 1, wherein the upper insulating plate includes end portions that are formed on opposing ends thereof and are bent toward the lower closure to form bent portions.

17. The electric double layer device according to claim 16, wherein the lower terminal directly contacts the bent portions of the upper insulating plate.

18. The electric double layer device according to claim 1, wherein the bottom surface of the lower terminal is substantially parallel to a top surface of the electrode unit.

* * * * *

UNITED STATES PATENT AND TRADEMARK OFFICE
CERTIFICATE OF CORRECTION

PATENT NO. : 10,692,662 B2
APPLICATION NO. : 14/990382
DATED : June 23, 2020
INVENTOR(S) : Young Jin Kim It is certified that error appears in the above-identified patent and that said Letters Patent is hereby corrected as shown below:

In the Drawings

Figure 1:
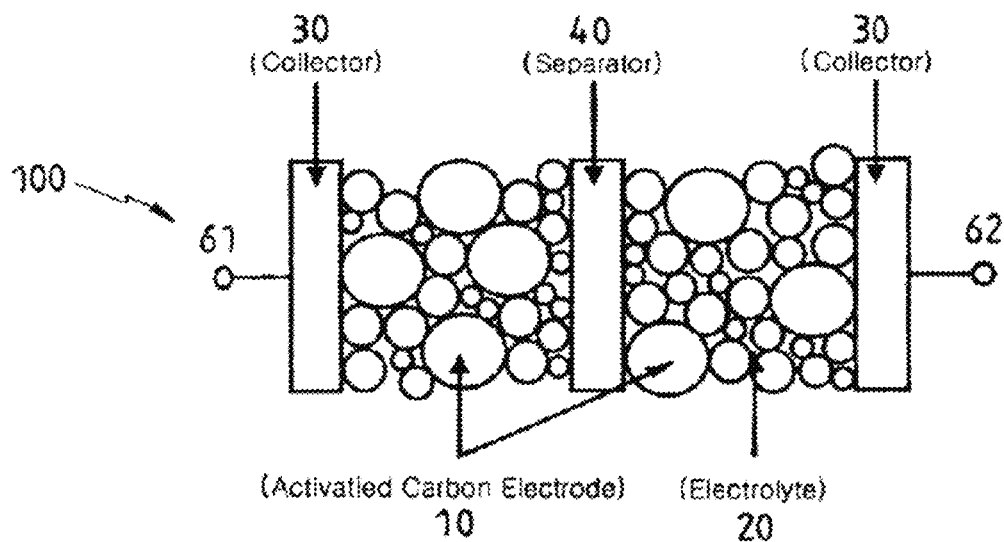
FIG. 1 is a schematic view showing the structure of a general electric double layer device.
Figure 2:
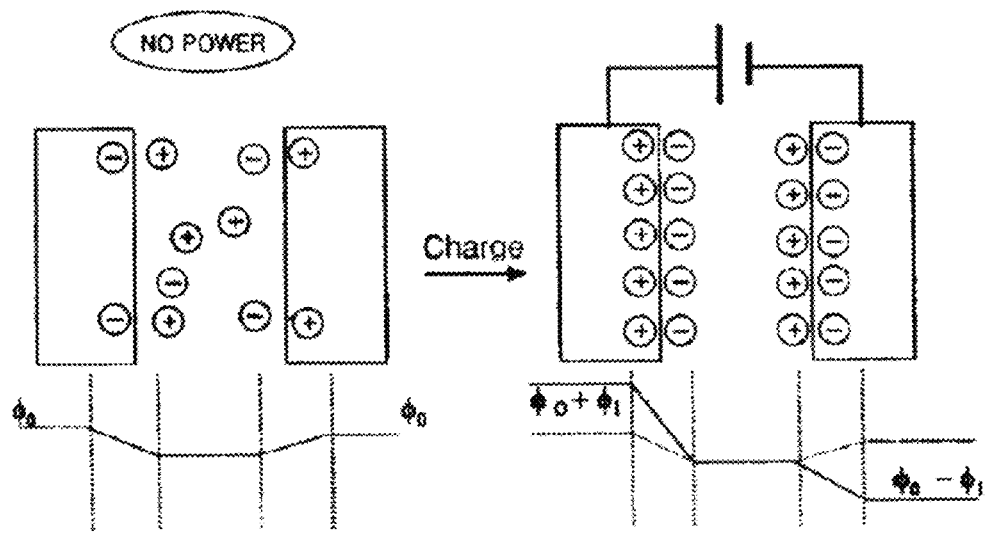
FIG. 2 is a schematic view illustrating a principle whereby an electric double layer capacitor, applied to a general electric double layer device, is charged.
Figure 3:
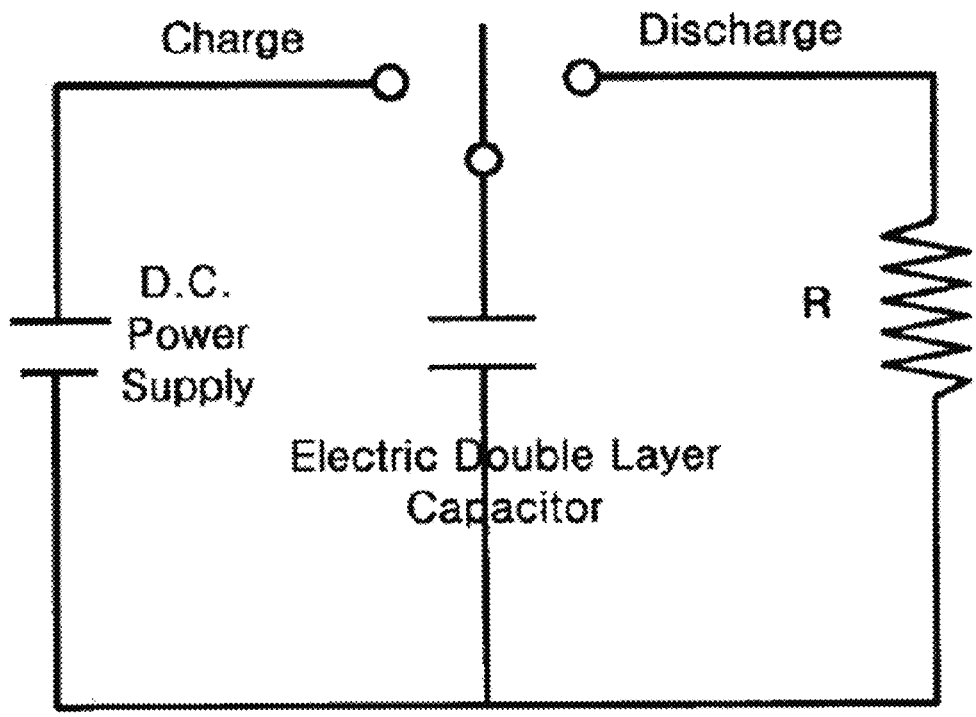
FIG. 3 is a circuit diagram illustrating a principle whereby the electric double layer capacitor applied to the general electric layer device is charged and discharged.
Figure 4:
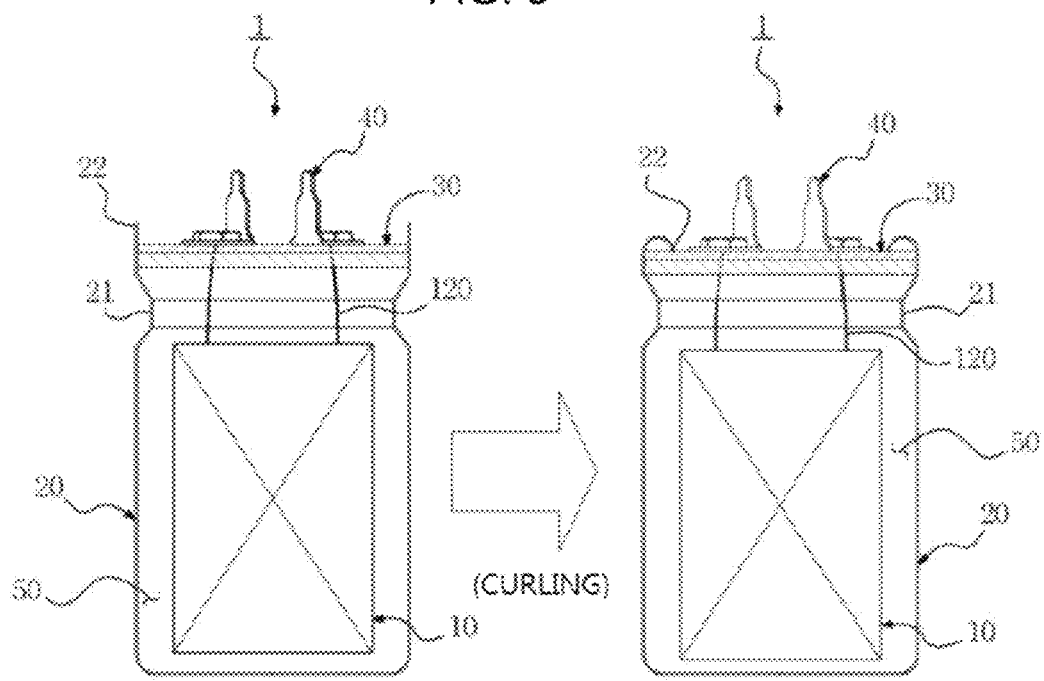
FIG. 4 is a view showing a process of manufacturing an electric double layer capacitor according to Related Art Document 1.
Figure 5:
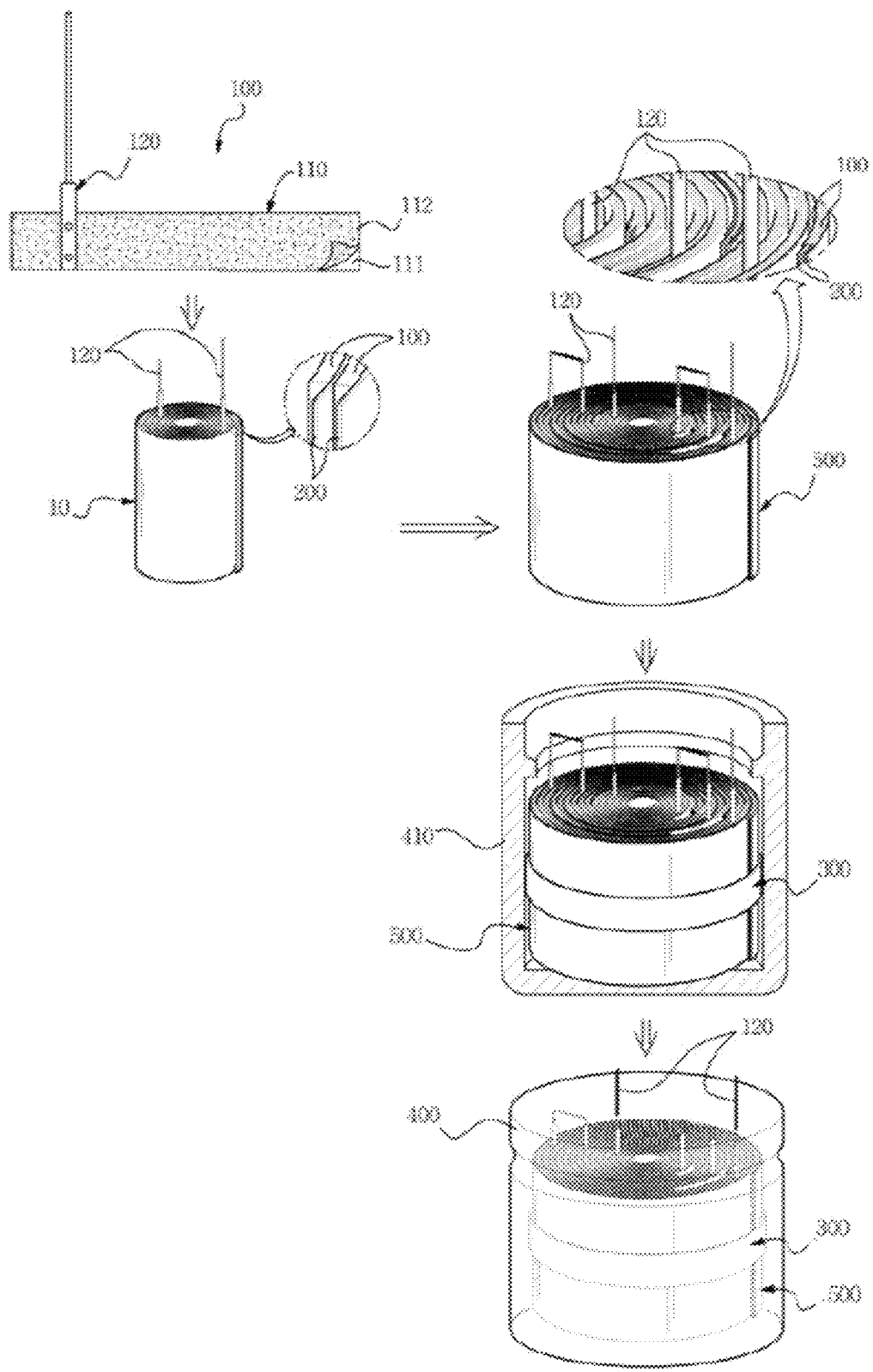
FIG. 5 is a view illustrating a method of manufacturing an integrated electric double layer capacitor according to Related Art Document 1.
Figure 6:
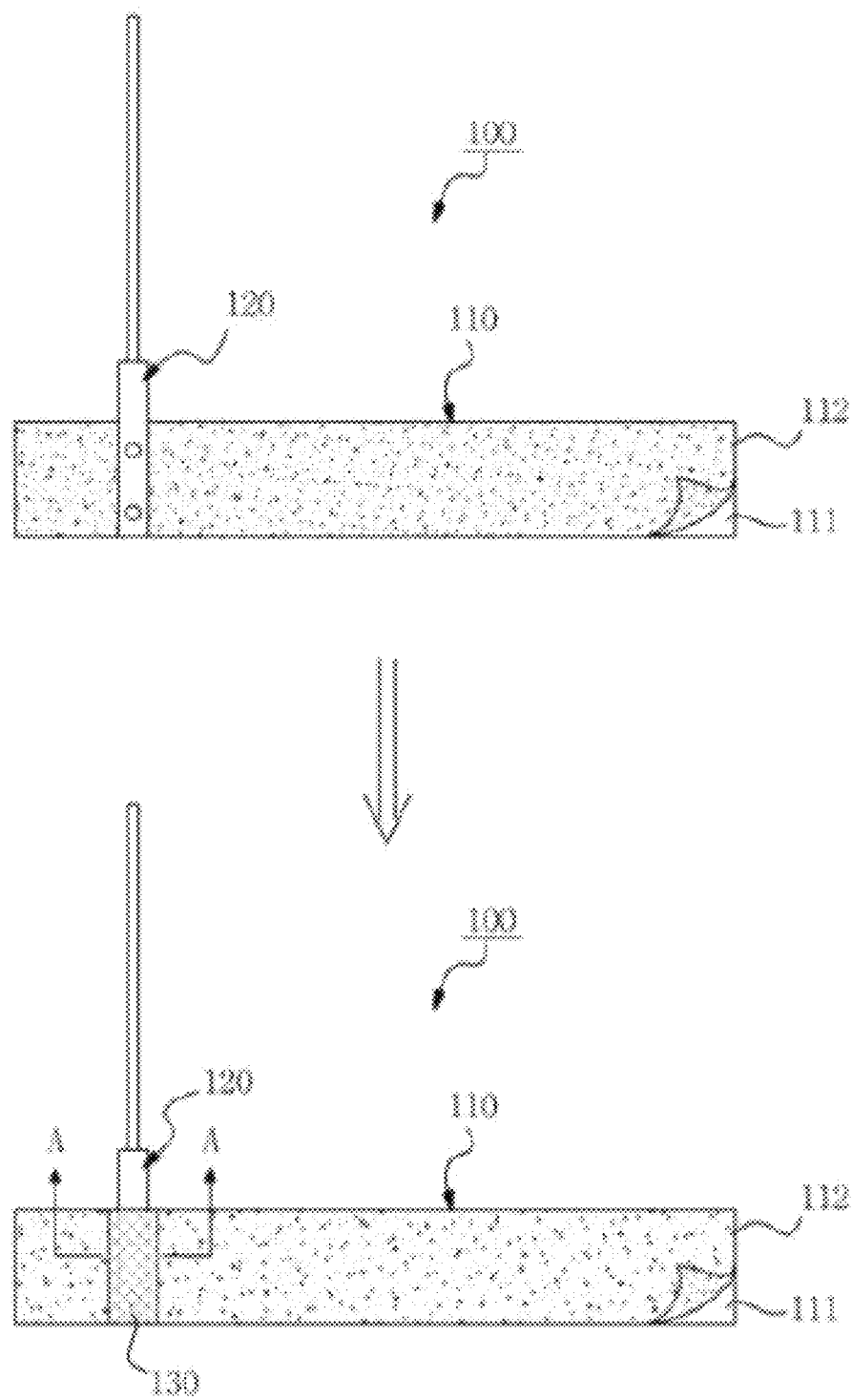
FIG. 6 is a view illustrating a process of manufacturing an electrode device that constitutes the electric double layer capacitor according to Related Art Document 1.
Figure 7:
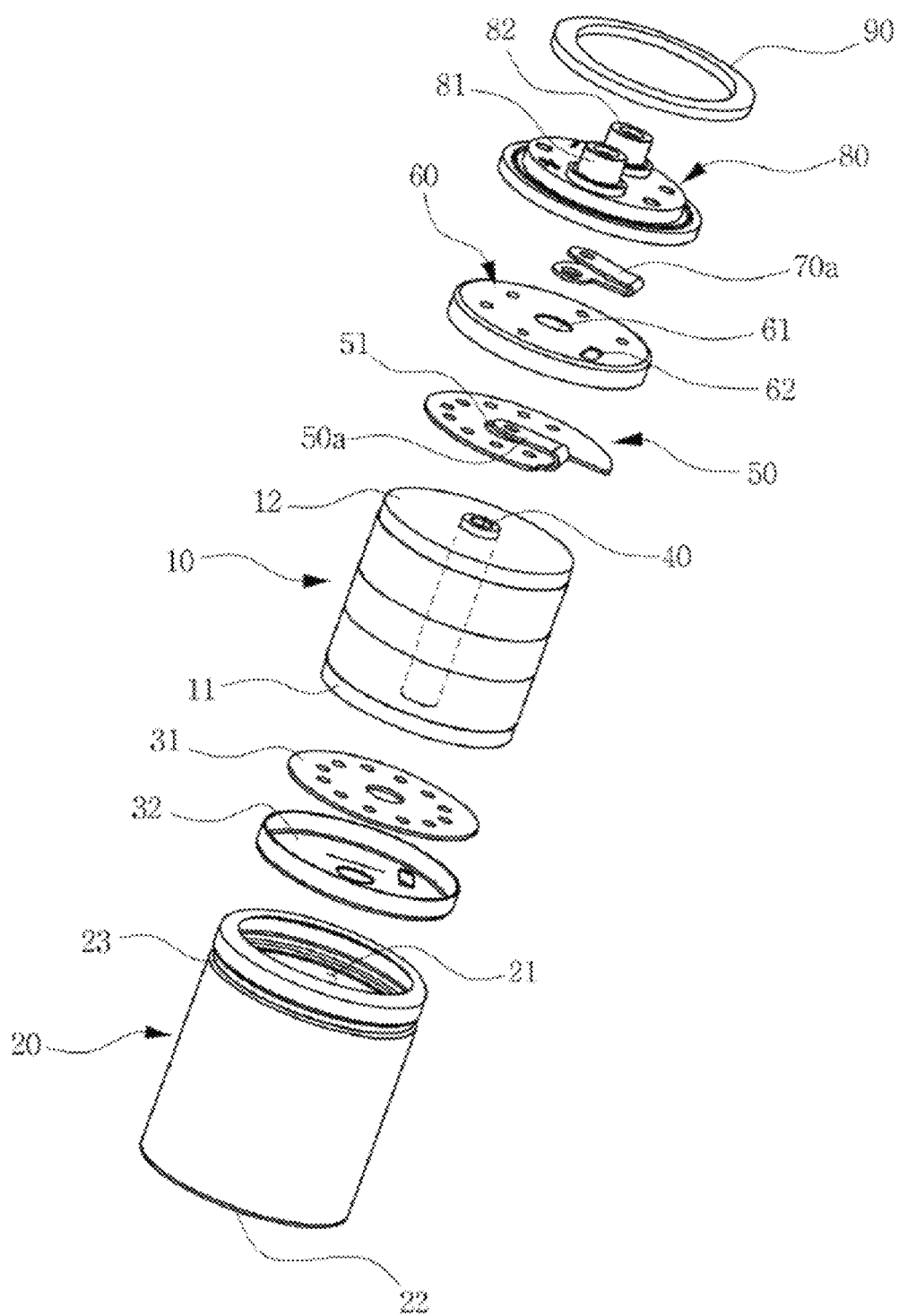
FIG. 7 is an exploded perspective view showing an electric double layer device according to Related Art Document 2.
Figure 8:
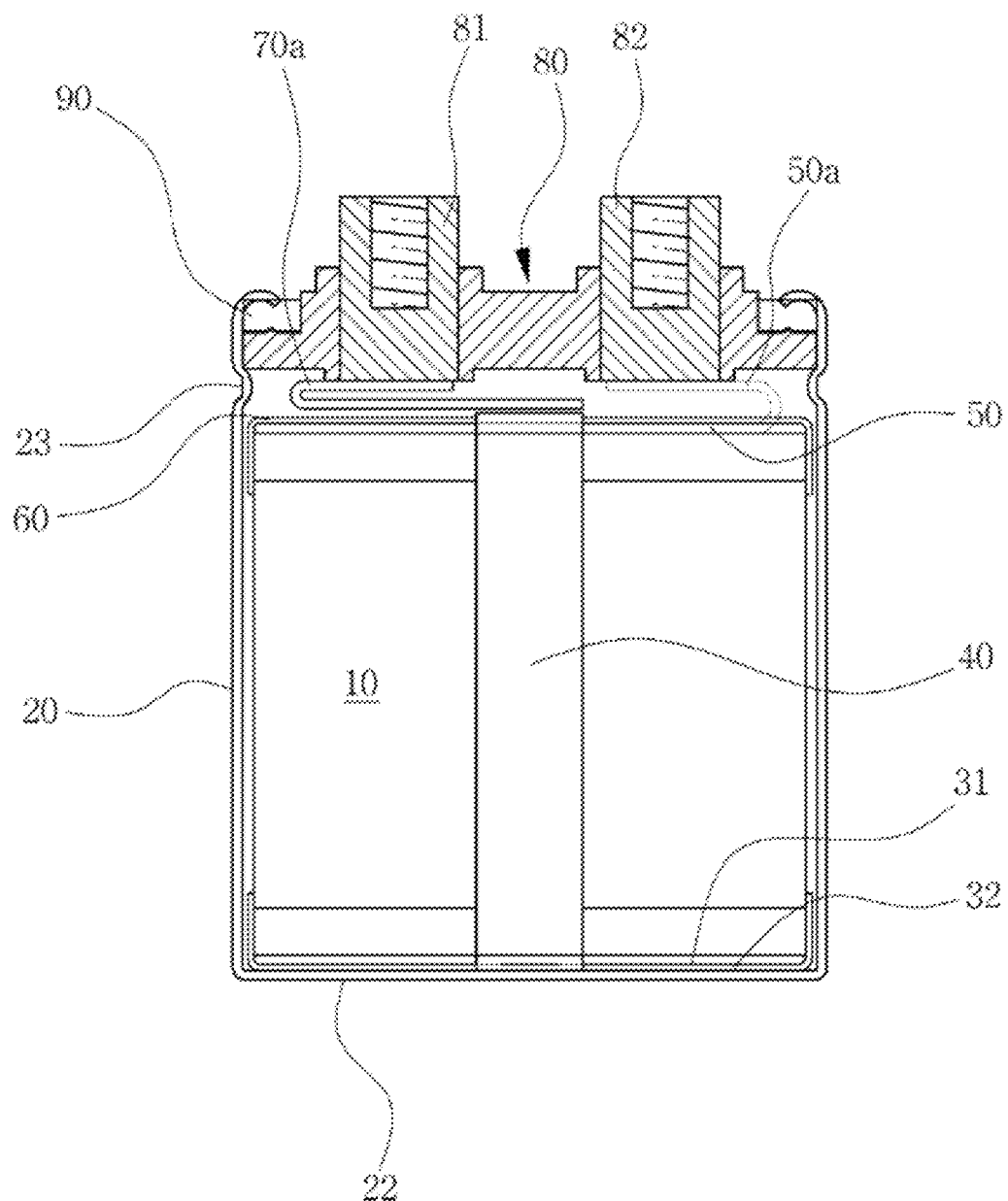
FIG. 8 is a sectional view showing the electric double layer device according to Related Art Document 2.
Figure 9A:
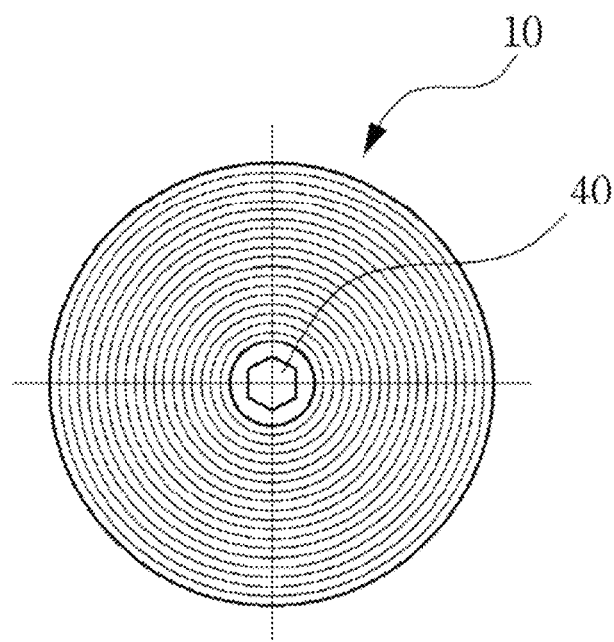
FIG. 9A is a plan view showing a wound unit for the electric double layer device according to Related Art Document 2.
Figure 9B:
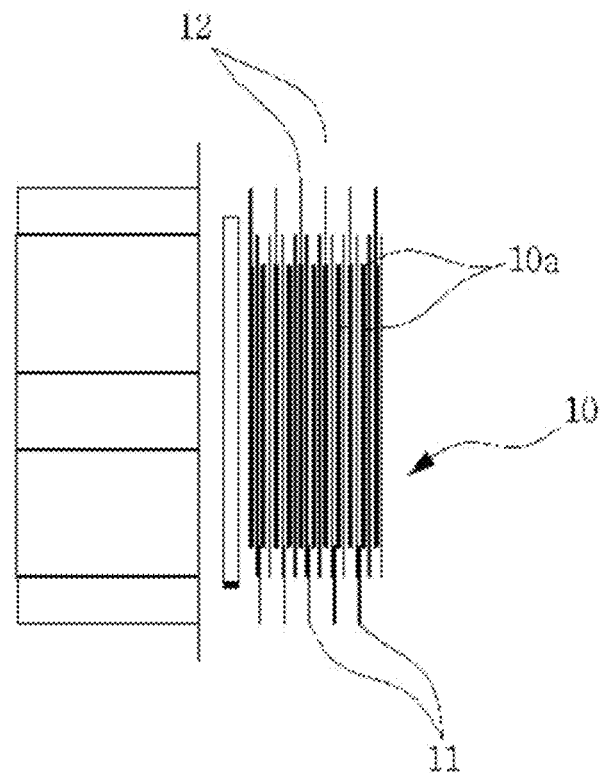
FIG. 9B is a half-sectional view showing the wound unit for the electric double layer device according to Related Art Document 2.

In sheet 1 of 22, FIG. 1, reference numeral 10, Line 1, delete "Activatied" and insert -- Activated --.

In the Specification

In Column 1, Line 6, delete "and," and insert -- and --.

In Column 1, Line 17, after "device" insert -- is --.

In Column 3, Line 57, delete "change," and insert -- change --.

In Column 3, Line 63, delete "electrode" and insert -- electrodes --.

In Column 5, Line 12, delete "strip shaped" and insert -- strip-shaped --.

In Column 5, Line 35, delete "The" and insert -- A --.

In Column 5, Line 66, after "plate" insert -- 31 --.

In Column 7, Line 11, delete "make" and insert -- makes --.

In Column 7, Line 28, delete "in" and insert -- is --.

In Column 8, Line 17, after "electric" insert -- double --.

In Column 8, Line 66, after "wound" insert -- unit that is --.

In Column 9, Line 58, delete "toe" and insert -- the --.

Signed and Sealed this
Fifteenth Day of September, 2020

Andrei Iancu
*Director of the United States Patent and Trademark Office*

In Column 10, Line 1, after "the" insert -- first --.

In Column 10, Line 3, after "plate" insert -- 70, --.

In the Claims

In Column 12, Line 26, Claim 5, delete "of" and insert -- according to --.

In Column 12, Line 42, Claim 9, delete "through-hole" and insert -- through hole --.

In Column 12, Line 53, Claim 11, delete "through-holes" and insert -- through holes --.

In Column 12, Line 53, Claim 11, delete "foamed" and insert -- formed --.